United States Patent
Kuboki

(10) Patent No.: US 8,446,443 B2
(45) Date of Patent: May 21, 2013

(54) IMAGE FORMING APPARATUS AND METHOD FOR CONTROLLING IMAGE FORMING METHOD

(75) Inventor: Ryoichi Kuboki, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 386 days.

(21) Appl. No.: 12/831,501

(22) Filed: Jul. 7, 2010

(65) Prior Publication Data

US 2011/0012981 A1 Jan. 20, 2011

(30) Foreign Application Priority Data

Jul. 16, 2009 (JP) .................. 2009-167982
Jun. 8, 2010 (JP) .................. 2010-130942

(51) Int. Cl.
*B41J 2/455* (2006.01)
*B41J 2/435* (2006.01)

(52) U.S. Cl.
USPC .......................... 347/233; 347/224

(58) Field of Classification Search
USPC ........ 349/73; 359/196, 279, 298; 219/121.61; 347/233, 224
See application file for complete search history.

(56) References Cited

U.S. PATENT DOCUMENTS

| 2005/0179971 A1* | 8/2005 | Amada et al. ................. 359/196 |
| 2008/0204852 A1* | 8/2008 | Amada et al. ................. 359/279 |
| 2008/0210671 A1* | 9/2008 | Jennings et al. ......... 219/121.61 |

FOREIGN PATENT DOCUMENTS

JP   4197431   10/2008

\* cited by examiner

*Primary Examiner* — Stephen Meier
*Assistant Examiner* — Carlos A Martinez
(74) *Attorney, Agent, or Firm* — Oblon, Spivak, McClelland, Maier & Neustadt, L.L.P.

(57) ABSTRACT

An image forming apparatus includes: an optical-path deflecting unit that deflects optical paths of optical beams in one group out of two groups, the optical beams being provided in a sub-scanning direction at a predetermined pitch; a scanning unit that scans a surface to in a main scanning direction with the one group of which the optical paths have been deflected and another group of which the optical paths are not deflected; and a control unit that controls the optical-path deflecting unit to deflect optical paths of the optical beams in the one group so that irradiation positions of the optical beams in the one group and irradiation positions of the optical beams in the another group are alternately arranged at regular intervals.

15 Claims, 21 Drawing Sheets

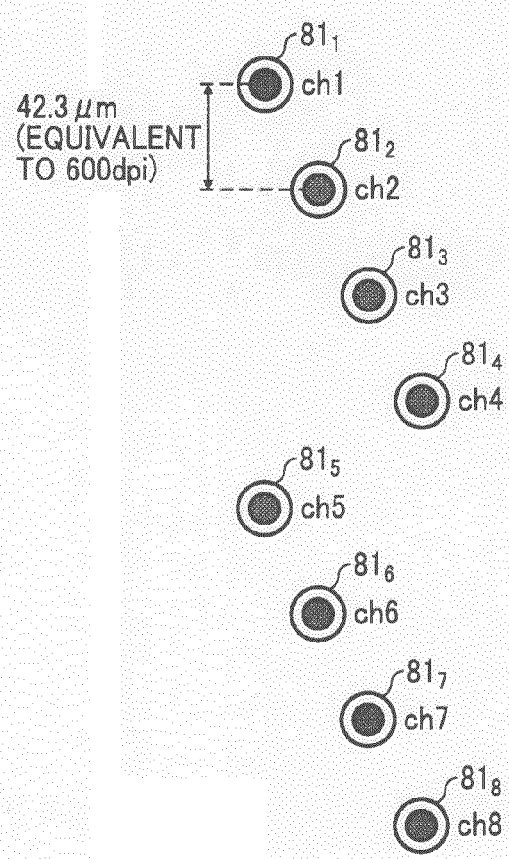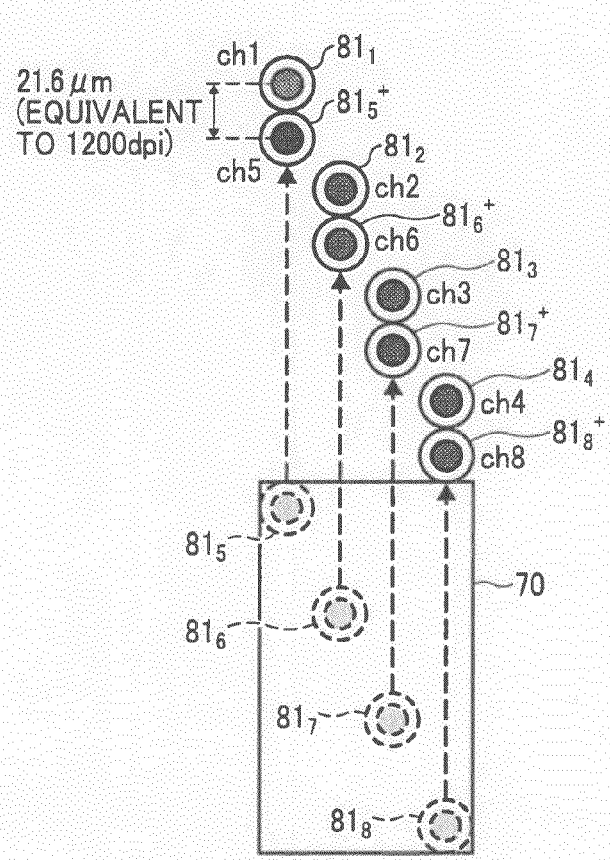

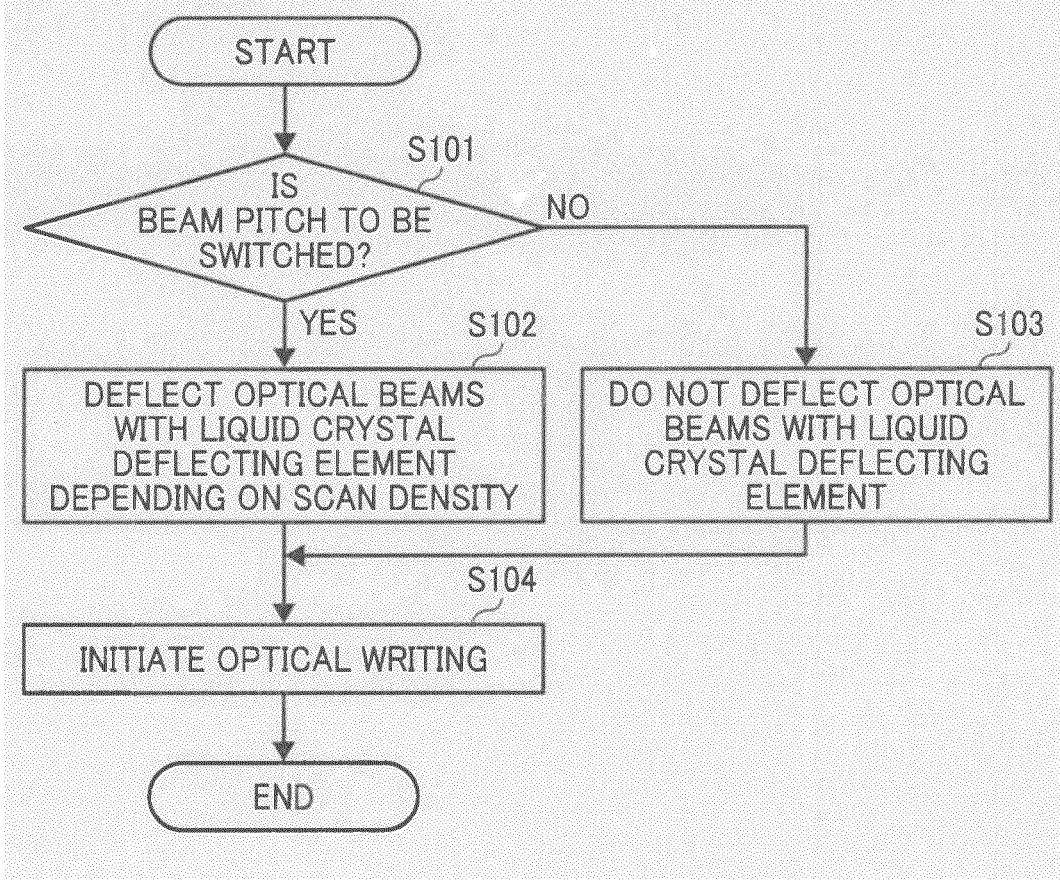

BEFORE PITCH IS SWITCHED

AFTER PITCH IS SWITCHED

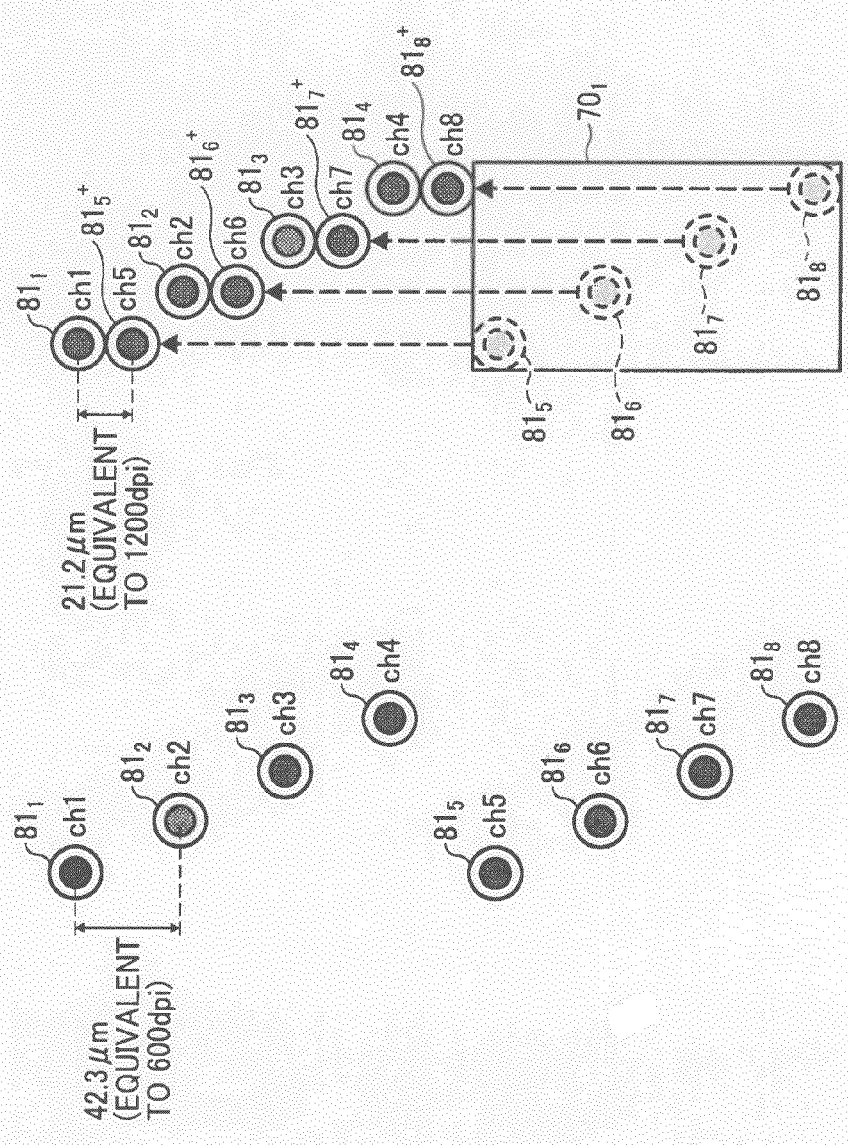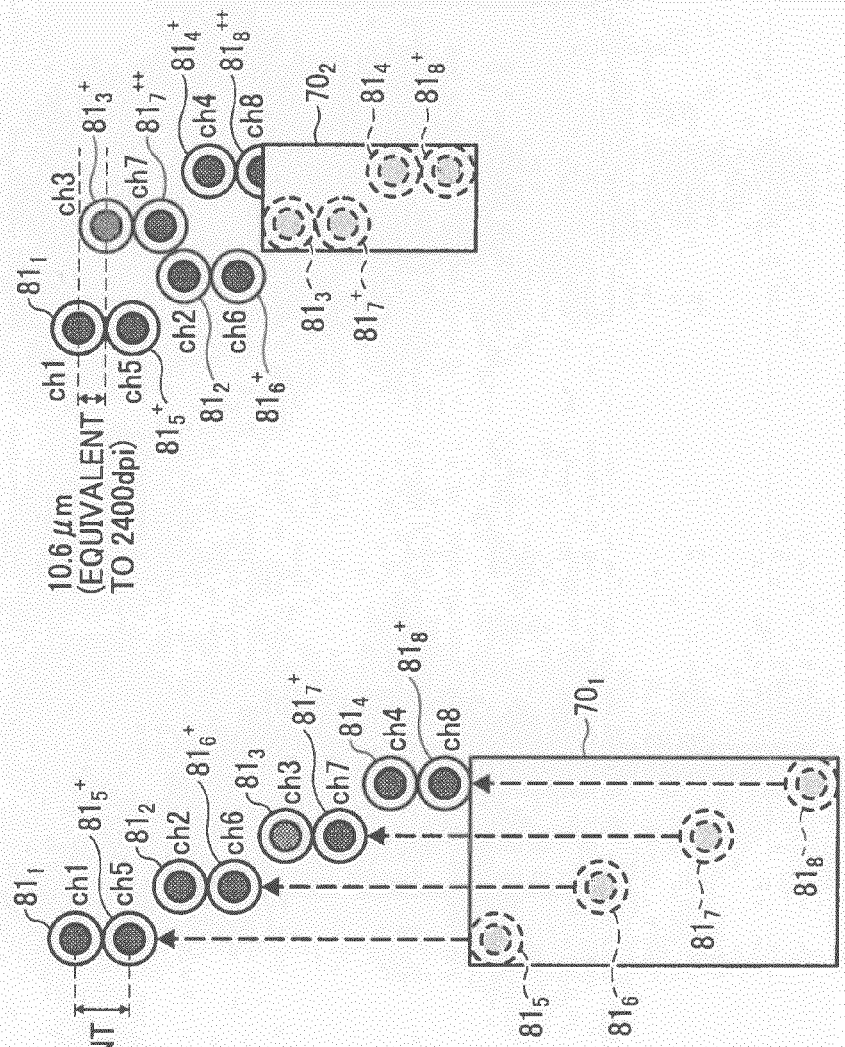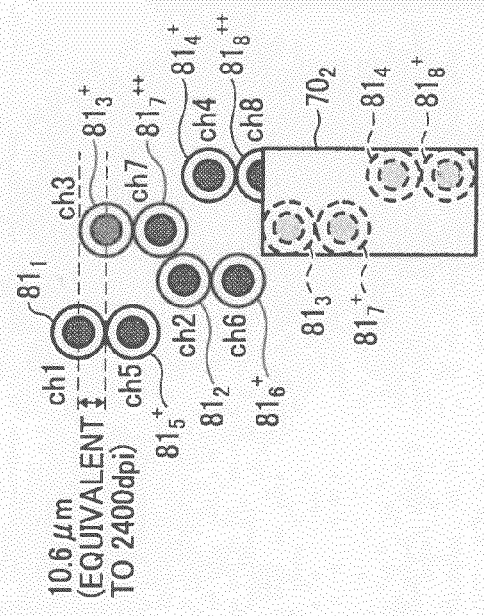

BELT MOVING DIRECTION

FIG. 16

|  | 600 dpi (NO LIQUID CRYSTAL DEFLECTING ELEMENT IS ACTIVATED) | 1200 dpi (FIRST LIQUID CRYSTAL DEFLECTING ELEMENT IS ACTIVATED) | 2400 dpi (FIRST AND SECOND LIQUID CRYSTAL DEFLECTING ELEMENTS ARE ACTIVATED) |
|---|---|---|---|
| FIFO#1 | WDATA#1/WE#1/RE#1 | WDATA#1/WE#1/RE#1 | WDATA#1/WE#1/RE#1 |
| FIFO#2 | WDATA#2/WE#2/RE#2 | WDATA#3/WE#3/RE#3 | WDATA#2/WE#2/RE#2 |
| FIFO#3 | WDATA#3/WE#3/RE#3 | WDATA#2/WE#2/RE#2 | WDATA#3/WE#3/RE#3 |
| FIFO#4 | WDATA#4/WE#4/RE#4 | WDATA#4/WE#4/RE#4 | WDATA#4/WE#4/RE#4 |

FIG. 17

| | 600 dpi (NO LIQUID CRYSTAL DEFLECTING ELEMENT IS ACTIVATED) | 1200 dpi (FIRST LIQUID CRYSTAL DEFLECTING ELEMENT IS ACTIVATED) | 2400 dpi (FIRST AND SECOND LIQUID CRYSTAL DEFLECTING ELEMENTS ARE ACTIVATED) |
|---|---|---|---|
| FIFO#1 | WDATA#1/WE#1/RE#1 | WDATA#1/WE#1/RE#1 | WDATA#1/WE#1/RE#1 |
| FIFO#2 | WDATA#2/WE#2/RE#2 | WDATA#3/WE#3/RE#3 | WDATA#5/WE#5/RE#5 |
| FIFO#3 | WDATA#3/WE#3/RE#3 | WDATA#5/WE#5/RE#5 | WDATA#2/WE#2/RE#2 |
| FIFO#4 | WDATA#4/WE#4/RE#4 | WDATA#7/WE#7/RE#7 | WDATA#6/WE#6/RE#6 |
| FIFO#5 | WDATA#5/WE#5/RE#5 | WDATA#2/WE#2/RE#2 | WDATA#3/WE#3/RE#3 |
| FIFO#6 | WDATA#6/WE#6/RE#6 | WDATA#4/WE#4/RE#4 | WDATA#7/WE#7/RE#7 |
| FIFO#7 | WDATA#7/WE#7/RE#7 | WDATA#6/WE#6/RE#6 | WDATA#4/WE#4/RE#4 |
| FIFO#8 | WDATA#8/WE#8/RE#8 | WDATA#8/WE#8/RE#8 | WDATA#8/WE#8/RE#8 |

FIG. 18

| LD | 600 dpi | | | 1200 dpi | | | 2400 dpi | | |
|---|---|---|---|---|---|---|---|---|---|
| | FIRST LIQUID CRYSTAL DEFLECTING ELEMENT | SECOND LIQUID CRYSTAL DEFLECTING ELEMENT | TRANS-MITTANCE | FIRST LIQUID CRYSTAL DEFLECTING ELEMENT | SECOND LIQUID CRYSTAL DEFLECTING ELEMENT | TRANS-MITTANCE | FIRST LIQUID CRYSTAL DEFLECTING ELEMENT | SECOND LIQUID CRYSTAL DEFLECTING ELEMENT | TRANS-MITTANCE |
| ch1 | - | - | T | - | - | T | - | - | T |
| ch2 | - | OFF | TxToff | - | OFF | TxToff | - | ON | TxTon |
| ch3 | OFF | - | TxToff | ON | - | TxTon | ON | - | TxTon |
| ch4 | OFF | OFF | TxToffxToff | ON | OFF | TxTonxToff | ON | ON | TxTonxTon |

FIG. 19

| LD | 600 dpi | | | 1200 dpi | | | 2400 dpi | | |
|---|---|---|---|---|---|---|---|---|---|
| | FIRST LIQUID CRYSTAL DEFLECTING ELEMENT | SECOND LIQUID CRYSTAL DEFLECTING ELEMENT | TRANS-MITTANCE | FIRST LIQUID CRYSTAL DEFLECTING ELEMENT | SECOND LIQUID CRYSTAL DEFLECTING ELEMENT | TRANS-MITTANCE | FIRST LIQUID CRYSTAL DEFLECTING ELEMENT | SECOND LIQUID CRYSTAL DEFLECTING ELEMENT | TRANS-MITTANCE |
| ch1 | – | – | T | – | – | T | – | – | T |
| ch2 | – | – | T | – | – | T | – | – | T |
| ch3 | – | OFF | TxToff | – | OFF | TxToff | – | ON | TxTon |
| ch4 | – | OFF | TxToff | – | OFF | TxToff | – | ON | TxTon |
| ch5 | OFF | – | TxToff | ON | – | TxTon | ON | – | TxTon |
| ch6 | OFF | – | TxToff | ON | – | TxTon | ON | – | TxTon |
| ch7 | OFF | OFF | TxToffxToff | ON | OFF | TxTonxToff | ON | ON | TxTonxTon |
| ch8 | OFF | OFF | TxToffxToff | ON | OFF | TxTonxToff | ON | ON | TxTonxTon |

IMAGE FORMING APPARATUS AND METHOD FOR CONTROLLING IMAGE FORMING METHOD

CROSS-REFERENCE TO RELATED APPLICATIONS

The present application claims priority to and incorporates by reference the entire contents of Japanese Patent Application No. 2009-167982 filed in Japan on Jul. 16, 2009 and Japanese Patent Application No. 2010-130942 filed in Japan on Jun. 8, 2010.

BACKGROUND OF THE INVENTION

1. Field of the Invention

The present invention relates to an image forming apparatus capable of switching the beam pitch of optical beams that are emitted from a multi-beam emitting source by deflecting the optical beams with a liquid crystal deflecting element, and a method for controlling the image forming apparatus.

2. Description of the Related Art

Conventionally, there is known a method for adjusting the beam position on a surface to be scanned in such a way that a liquid crystal element, which is driven by the application of a voltage, is provided in a light source unit or just downstream of the light source unit in an optical scanning device used in an optical writing system of an electrophotographic image forming apparatus, where an optical beam is deflected by the liquid crystal element depending on a drive voltage (see Japanese Patent No. 4197431). Hereinafter, such a liquid crystal element used for deflecting an optical beam is referred to as a "liquid crystal deflecting element".

FIGS. 22A and 22B conceptually illustrate how optical beams emitted from a multi-beam emitting source are deflected by a liquid crystal deflecting element according to a conventional technology. FIGS. 22A and 22B illustrate examples of 2-beam scanning and 4-beam scanning, respectively. The multi-beam emitting source is composed of, for example, a laser diode (LD) or an LD array.

FIG. 22A illustrates an example where two beams fixed at a pitch of 21.6 micrometers (equivalent to a scan density of 1200 dots per inch (dpi)), which are emitted from a multi-beam emitting source, are deflected by passing through a liquid crystal deflecting element, thereby being changed of the pitch of the beams on a surface to be scanned in a range from 10.6 micrometers (equivalent to a scan density of 2400 dpi) to 42.3 micrometers (equivalent to a scan density of 600 dpi). The pitch can be decreased by deflecting the two beams inward; the pitch can be increased by deflecting the two beams outward.

FIG. 22B illustrates an example where four beams fixed at a pitch equivalent to a scan density of 600 dpi pass through liquid crystal deflecting elements, thereby changing the pitch of the beams on a surface to be scanned to a pitch of 21.2 micrometers (equivalent to a scan density of 1200 dpi). In this case, to irradiate the surface to be scanned with the four beams at regular intervals, the deflection angle differs between the two outer beams and the two inner beams.

In this manner, in the case of changing the scan density, a drive voltage depending on an amount of deflection is applied to the liquid crystal deflecting element acting on the beams, whereby the surface to be scanned can be scanned at the desired scan density.

In the method according to the conventional technology described above with reference to FIGS. 22A and 22B, in any of these cases of 2-beam scanning and 4-beam scanning, to deflect beams independently of one another, it is necessary to provide N number of liquid crystal deflecting elements with respect to N number of beams. Or, also in a case of using a single liquid crystal deflecting element capable of controlling the deflection for each effective area, it is necessary to provide a liquid crystal deflecting element having N number of effective areas.

Furthermore, there may be a case where one out of N number of beams is fixed and N−1 number of the other beams are deflected. However, also in this case, N−1 number of liquid crystal deflecting elements or effective areas are required. In either case, the number of required liquid crystal deflecting elements (or effective areas) is increased with an increase in the number of beams.

Moreover, since the deflection angle differs from one beam to another, a different drive voltage needs to be set for each liquid crystal deflecting element or each effective area, which makes the control complicated.

SUMMARY OF THE INVENTION

It is an object of the present invention to at least partially solve the problems in the conventional technology.

According to an aspect of the present invention, there is provided an image forming apparatus including: an optical-path deflecting unit that deflects optical paths of optical beams in one group out of two groups, the optical beams being provided in a sub-scanning direction at a predetermined pitch, and each of the two groups being composed of more or less a same number of adjacent optical beams; a scanning unit that scans a surface to be scanned in a main scanning direction with the one group of the optical beams of which the optical paths have been deflected by the optical-path deflecting unit and another group of the optical beams of which the optical paths are not deflected by the optical-path deflecting unit; and a control unit that controls the optical-path deflecting unit to deflect optical paths of the optical beams in the one group so that irradiation positions of the optical beams in the one group on the surface to be scanned and irradiation positions of the optical beams in the another group on the surface to be scanned are alternately arranged at regular intervals.

According to another aspect of the present invention, there is provided an image forming apparatus including: an optical-path deflecting means for deflecting optical paths of optical beams in one group out of two groups, the optical beams being provided in a sub-scanning direction at a predetermined pitch, and each of the two groups being composed of more or less a same number of adjacent optical beams; a scanning means for scanning a surface to be scanned in a main scanning direction with the one group of the optical beams of which the optical paths have been deflected by the optical-path deflecting means and another group of the optical beams of which the optical paths are not deflected by the optical-path deflecting means; and a control means for controlling the optical-path deflecting means to deflect optical paths of the optical beams in the one group so that irradiation positions of the optical beams in the one group on the surface to be scanned and irradiation positions of the optical beams in the another group on the surface to be scanned are alternately arranged at regular intervals.

According to still another aspect of the present invention, there is provided a method for controlling image forming used in an image forming apparatus including: deflecting optical paths of optical beams in one group out of two groups by an optical-path deflecting unit, the optical beams being provided in a sub-scanning direction at a predetermined pitch, and each of the two groups being composed of more or less a same number of adjacent optical beams; scanning a surface to be scanned in a main scanning direction with the one group of the optical beams of which the optical paths have been deflected by the optical-path deflecting unit and another group of the optical beams of which the optical paths are not deflected by the optical-path deflecting unit by a scanning unit; and controlling by a control unit the optical-path deflecting unit to deflect optical paths of the optical beams in the one group so that irradiation positions of the optical beams in the one group on the surface to be scanned and irradiation positions of the optical beams in the another group on the surface to be scanned are alternately arranged at regular intervals.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 4A and 4B are schematic diagrams illustrating an example where the first embodiment of the present invention is applied to a multi-beam emitting source that emits eight optical beams;

FIG. 5 is a flowchart conceptually illustrating an example of a beam-pitch switching process according to the first embodiment of the present invention;

FIGS. 8A to 8C are schematic diagrams illustrating an example where the second embodiment of the present invention is applied to a multi-beam emitting source that emits eight optical beams;

FIG. 16 is a schematic diagram illustrating an example of combinations of image data and channels of optical beams for keeping the order of the image data unchanged before and after deflection of optical beams;

FIG. 17 is a schematic diagram illustrating an example of combinations of image data and channels of optical beams for keeping the order of the image data unchanged before and after deflection of optical beams;

FIG. 18 is a schematic diagram illustrating an example of transmittances with respect to optical beams of the channels in each resolution mode;

FIG. 19 is a schematic diagram illustrating an example of transmittances with respect to optical beams of the channels in each resolution mode;

DETAILED DESCRIPTION OF THE PREFERRED EMBODIMENTS

Figure 1A:
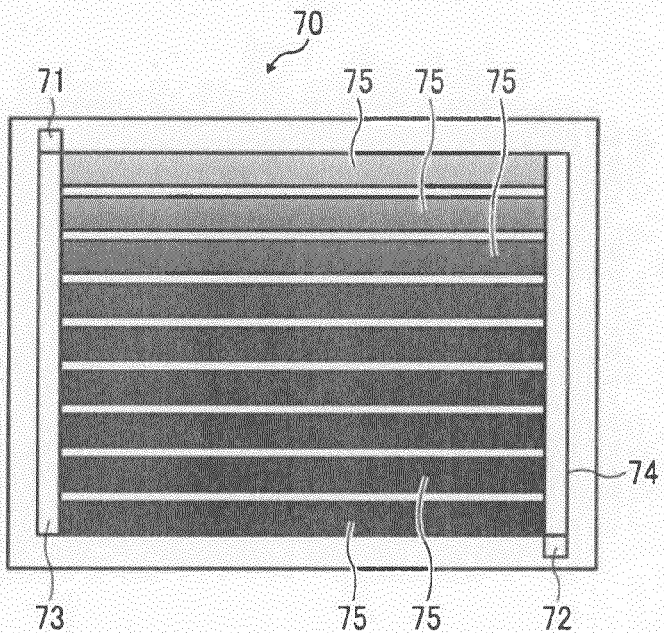
FIGS. 1A and 1B are schematic diagrams illustrating a configuration of an example of a liquid crystal deflecting element applicable to embodiments.

Exemplary embodiments of an image forming apparatus that performs a beam-pitch switching process according to the present invention are explained in detail below with reference to the accompanying drawings. In the embodiments of the present invention, beams, such as an LD that are emitted from a light-emitting source, are reflected by a rotating polygon mirror, are scanned in a main scanning direction, and are optically written on a surface to be scanned (a rotary drum) rotating in a sub-scanning direction; these three or more optical beams are arranged in the sub-scanning direction at a predetermined pitch, and are divided into two groups each including more or less the same number of adjacent optical beams in the sub-scanning direction. Then, multiple optical beams included in one of the two groups are collectively deflected toward the other group by the action of an optical-path deflecting element, whereby an array of the optical beams in the one group is caused to cut into an array of the optical beams in the other group. At this time, the optical beams in the one group are deflected so that the irradiation positions of the optical beams in the one group and the optical beams in the other group on the surface to be scanned are alternately arranged at regular intervals. This switches the pitch of the optical beams.

Liquid Crystal Deflecting Element:

In the embodiments of the present invention, as the optical-path deflecting element, a liquid crystal deflecting element is used. First, an applicable liquid crystal deflecting element common to the embodiments of the present invention is explained.

In the embodiments of the present invention, as the basis for slightly deflecting an optical path of an optical beam with accuracy, a liquid crystal deflecting element is used as a means for this. The liquid crystal deflecting element has a structure that a nematic liquid crystal layer, being in homogeneous molecular alignment, is sandwiched between two glass substrates, and a metal-oxide transparent electrode is formed on each of the opposed surfaces of the two glass substrates. One of the metal-oxide transparent electrodes is, for example, a ground electrode at ground potential; the other metal-oxide transparent electrode is a drive electrode to which a drive voltage is applied.

When a drive voltage (for example, a square wave of a few kilohertz) is applied to the drive electrode, nematic liquid crystal molecules having a birefringence index (a difference in refractive index between the long axis and the short axis of the molecules) tilt along an electric field. Namely, for a monochromatic light having a linearly-polarized light parallel to the direction of the long axis of the liquid crystal molecules, the liquid crystal layer is equivalent to a medium having a distribution of the refractive index which locally varies depending on a distribution of the electric field. Therefore, spatial wavefront modulation or phase modulation depending on an in-plane distribution of applied voltage to the liquid crystal layer is added to the wavefront of light that has passed through the liquid crystal layer.

Electro-optical characteristics depend on an elastic constant of liquid crystal used, the dielectric constant anisotropy, and an initial orientation angle of the liquid crystal molecules when applied with no voltage. The liquid crystal molecules having a small initial orientation angle (for example, 5 degrees or less) shows a steep fall in a low-voltage region of the electro-optical characteristics, but shows an approximately linear response with increase in voltage, and after that, shows the characteristic of being saturated at a constant value. On the other hand, the liquid crystal molecules having a large initial orientation angle do not show a steep fall unlike those having the small initial orientation angle described just above, but shows the characteristics of approximating a curve of the low-voltage region by square curve.

As an electrode pattern of the drive electrode, there is proposed a configuration that a large number of long and thin transparent electrodes are arranged in the form of stripes and a predetermined voltage is applied to each of the transparent electrodes. In this configuration, a fast response, a high spatial resolution, and a high degree of freedom of wavefront modulation can be achieved. If a degree of freedom of wavefront modulation is high, not only the functions of beam deflection and a lens but also arbitrary complex wavefront modulation can be achieved.

Figure 1B:
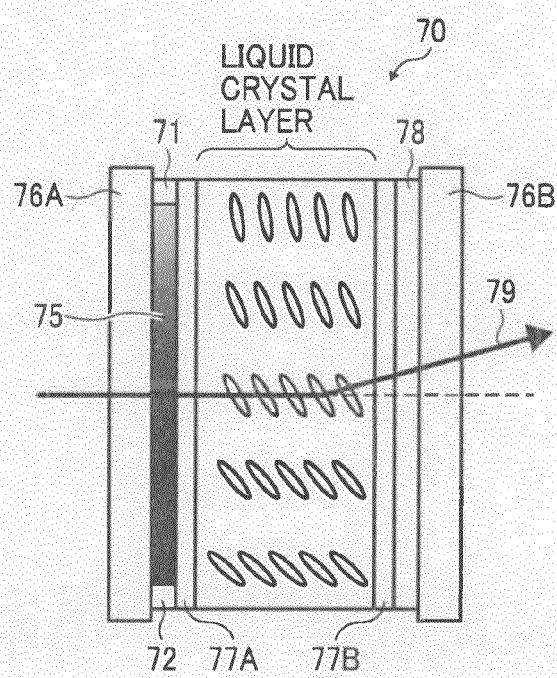

FIGS. 1A and 1B illustrate a configuration of an example of a liquid crystal deflecting element 70 applicable to the embodiments. FIG. 1A is a diagram of the liquid crystal deflecting element 70 viewed from the front, i.e., from the direction of an optical axis. FIG. 1B is a cross-sectional view of the liquid crystal deflecting element 70 along the optical axis.

As shown in FIG. 1B, a transparent electrode 75, which is a drive electrode, is formed on a glass substrate 76A, one of two glass substrates 76, and layered by an alignment film 77A so as to cover the transparent electrode 75. A drive voltage is applied to the transparent electrode 75 through terminals 71 and 72. A uniform transparent electrode 78, which is a ground electrode, is formed over the nearly whole surface of a glass substrate 76B, the other glass substrate 76, and is layered by an alignment film 77B so as to cover the transparent electrode 78. A portion between the alignment films 77A and 77B is filled with liquid crystal, which is formed into a liquid crystal layer.

As shown in FIG. 1A, a large number of the transparent electrodes 75, 75, . . . are formed in the form of stripes. The transparent electrodes 75, 75, . . . are formed in an optical-beam irradiation area of the liquid crystal deflecting element 70 with the line width depending on the resolution in the exposure technology (for example, approximately 1 micrometer) and at intervals. Outside the optical-beam irradiation area, one ends of the transparent electrodes 75, 75, . . . are connected by a resistance member 73. The terminal 71 is provided on one end of the resistance member 73. Similarly, the other ends of the transparent electrodes 75, 75, . . . are connected by a resistance member 74 outside the optical-beam irradiation area. The terminal 72 is provided on one end of the resistance member 74 on the side opposite to the terminal 71.

By the application of predetermined drive voltages to the terminals 71 and 72, liquid crystal molecules of the liquid crystal layer are oriented depending on the drive voltages, so that an optical beam 79 that has entered the liquid crystal deflecting element 70 is deflected and exits from the liquid crystal deflecting element 70.

Figure 2:
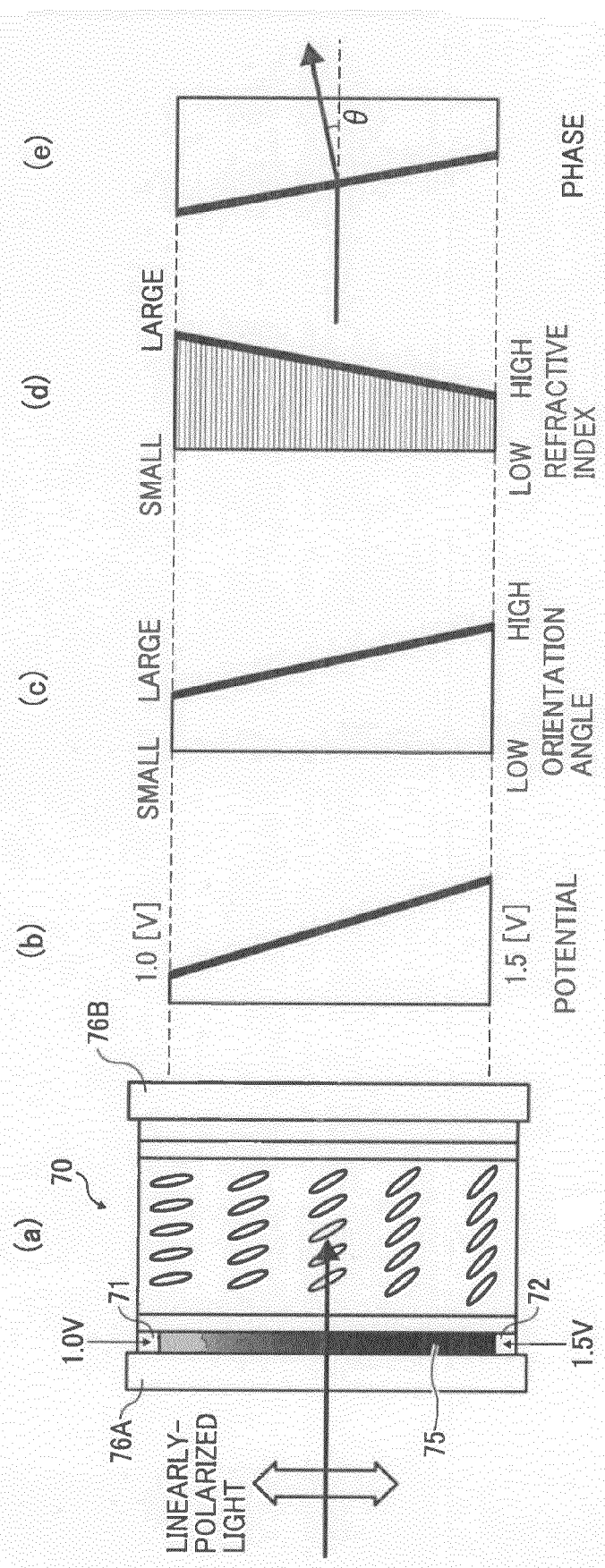
FIG. 2 is a schematic diagram for schematically explaining a mechanism of how the liquid crystal deflecting element deflects an optical beam.

A mechanism of how the liquid crystal deflecting element 70 deflects an optical beam is schematically explained with reference to FIG. 2. FIG. 2(a) corresponds to FIG. 1B described above, and illustrates the cross-sectional view of the liquid crystal deflecting element 70 along the optical axis. Different values of drive voltages $E_1$ and $E_2$ are input to the terminals 71 and 72, respectively. As a result, a certain potential difference occurs between the terminals 71 and 72, and a gradient potential electrode that the potential is graded by the potential difference $\Delta E = E_1 - E_2$ in an array direction of the transparent electrodes 75, 75, . . . is composed of the transparent electrodes 75, 75, . . . (see FIG. 2(b)). In the example shown in FIG. 2, a drive voltage of 1 volt (V) is applied to the terminal 71, and a drive voltage of 1.5 V is applied to the terminal 72, and a potential difference of 0.5 V occurs.

With the gradient by the potential difference as illustrated in FIG. 2(c), an orientation angle of the liquid crystal molecules of the liquid crystal layer changes toward the array direction of the transparent electrodes 75, 75, . . . ; and, with the change in orientation angle, the refractive index of the liquid crystal layer also changes as illustrated in FIG. 2(d). Since the refractive index of the liquid crystal layer changes as illustrated in FIG. 2(e), the traveling direction of the optical beam, which has been linearly polarized in the array direction of the transparent electrodes 75, 75, . . . and entered the liquid crystal layer, is bent before passing through the liquid crystal layer, and deflected by a deflection angle θ.

The liquid crystal deflecting element 70 configured like this is arranged on an optical path of the optical beam, whereby the traveling direction of the optical beam can be deflected in a direction corresponding to the array direction of the transparent electrodes 75, 75, . . . . Furthermore, the deflection angle θ varies, as shown in FIG. 2(b) to FIG. 2(e), depending on a potential difference between the drive voltages $E_1$ and $E_2$ input to the terminals 71 and 72, respectively. Therefore, by the settings of the drive voltages $E_1$ and $E_2$, a desired deflection angle θ can be obtained within a predetermined range.

Namely, the number of the bundled long and thin transparent electrodes 75, 75, . . . (the total width of the transparent electrodes 75, 75, . . . ) is determined by the maximum beam deflection angle required in that area. When two different drive voltages selected from a linear region of electro-optical characteristics of the liquid crystal are respectively input to both ends of the gradient potential electrode extending in the array direction of the transparent electrodes 75, 75, . . . , a blaze phase profile is obtained, which can be made as an equivalent to a microprism array. A direction of an optical beam vertically incident on the liquid crystal layer can be controlled by changing a blaze angle by controlling the applied voltage to the gradient potential electrode.

First Embodiment

Subsequently, the principle of multi-beam pitch switching according to a first embodiment of the present invention is explained. In the first embodiment, first, a plurality of optical beams composing multi-beam composed of three or more optical beams arranged in the sub-scanning direction at regular intervals are divided into two groups each including more or less the same number of adjacent optical beams in the sub-scanning direction. For example, if the plurality of optical beams is four optical beams, the two groups each include two optical beams. Furthermore, for example, if the plurality of optical beams is five optical beams, one of the two groups includes two optical beams, and the other group includes three optical beams. Then, the optical beams included in one of the two groups are collectively deflected by the action of the liquid crystal deflecting element 70 described above. At this time, the deflection is controlled so that the irradiation positions of the optical beams in the one group and the optical beams in the other group on a surface to be scanned are alternately arranged at regular intervals.

The optical beams before deflected by the deflecting element 70 are arranged on the surface to be scanned in the sub-scanning direction at regular intervals, which have a predetermined pitch in the sub-scanning direction. Therefore, a set of two drive voltages is input to the liquid crystal deflecting element 70 so as to obtain one potential difference $\Delta E_1$ and the optical beams in the one of the two groups, to which the original optical beams are divided, are deflected by the same amount of deflection in the sub-scanning direction, whereby the one-half ($\frac{1}{2}$) pitch of the original pitch can be obtained.

Incidentally, in what follows, unless otherwise stated, the drive voltages $E_1$ and $E_2$ input to the liquid crystal deflecting element 70 to obtain the potential difference $\Delta E$ are arbitrarily referred to as "a set of drive voltages" or simply "drive voltages".

Figure 3A:
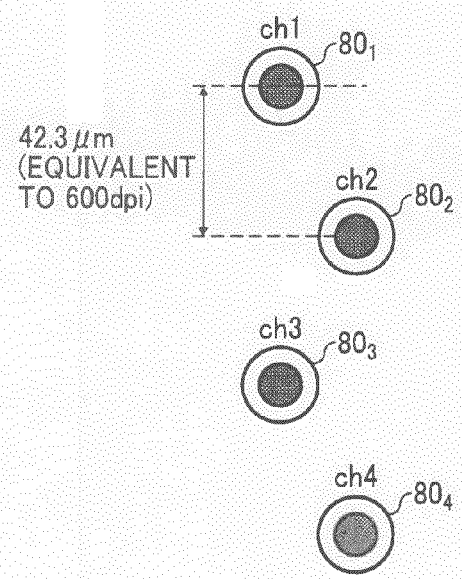
FIGS. 3A and 3B are schematic diagrams illustrating an example where a first embodiment of the present invention is applied to a multi-beam emitting source that emits four optical beams.
Figure 3B:
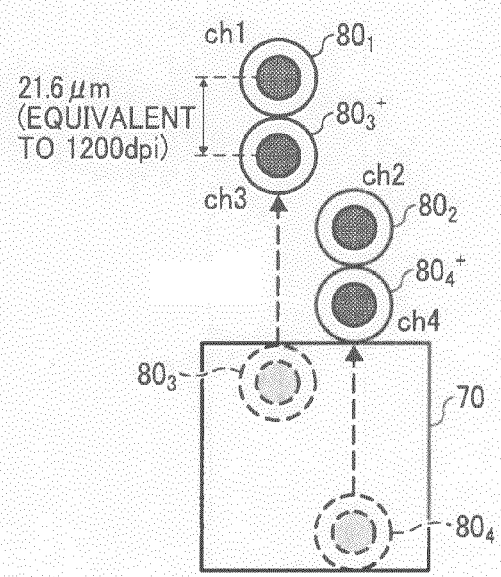

Subsequently, the multi-beam pitch switching according to the present first embodiment is more specifically explained. FIGS. 3A and 3B illustrate an example where the present first embodiment is applied to a multi-beam emitting source that emits four optical beams. Here, as illustrated in FIG. 3A, an optical beam array is formed of four optical beams $80_1$ to $80_4$ that are emitted in the sub-scanning direction at a pitch of 42.3 micrometers, which is equivalent to a scan density of 600 dpi and correspond to channels ch1 to ch4, respectively.

The optical beam array is divided into a first group composed of the adjacent optical beams $80_3$ and $80_4$ in the sub-scanning direction and a second group composed of the adjacent optical beams $80_1$ and $80_2$ in the sub-scanning direction. The single liquid crystal deflecting element 70 act on the optical beams $80_3$ and $80_4$ in the first group. Namely, as illustrated in FIG. 3B, predetermined drive voltages are input to the liquid crystal deflecting element 70, thereby causing the liquid crystal deflecting element 70 to deflect the optical beams $80_3$ and $80_4$ in the first group towards the direction of the optical beams $80_1$ and $80_2$ in the second group.

At this time, the drive voltages to be input to the liquid crystal deflecting element 70 are determined so that the irradiation positions of the optical beams $80_1$ and $80_2$ in the second group and the deflected optical beams $80_3$ and $80_4$ in the first group on a surface to be scanned are alternately arranged at regular intervals. For example, the drive voltages are determined so that the optical beam $80_3$ in the first group irradiates midway between the optical beams $80_1$ and $80_2$ in the second group. Since the optical beam $80_4$ in the first group is deflected by the same amount of deflection as the optical beam $80_3$ by the liquid crystal deflecting element 70, formed is an optical beam array of the optical beams $80_1$, $80_3{}^+$, $80_2$, and $80_4{}^+$ arranged in this order at regular intervals of the one-half ($\frac{1}{2}$) pitch of the pitch in the optical beam array before the deflection. In the example shown in FIG. 3B, the pitch of the optical beams after the deflection is 21.6 micrometers equivalent to a scan density of 1200 dpi that is one-half ($\frac{1}{2}$) of the pitch before the deflection.

Incidentally, in FIG. 3B and other similar drawings and the explanation described below, "+" is added to a reference sign of a deflected optical beam.

As can be seen from FIG. 3B, the order of the optical beams after the deflection changes from that of before the deflection, so the order of image data to be optically written on the surface to be scanned with the optical beams after the deflection becomes different from the original order. In the example shown in FIG. 3B, the order of ch1, ch2, ch3, and ch4, the order of the channels before the deflection, is changed to the order of ch1, ch3, ch2, and ch4 after the deflection. Therefore, to keep the order of image data to be optically written on the surface to be scanned unchanged before and after the deflection, allocation of the image data to the channels ch1 to ch4 is changed for the deflection operation.

FIGS. 4A and 4B illustrate an example where the first embodiment is applied to a multi-beam emitting source that emits eight optical beams. Here, as illustrated in FIG. 4A, an optical beam array is formed of eight optical beams $81_1$ to $81_8$ that are emitted in the sub-scanning direction at a pitch of 42.3 micrometers equivalent to a scan density of 600 dpi and correspond to channels ch1 to ch8, respectively.

The case of eight optical beams is similar to the case of the deflection of four optical beams explained above with reference to FIGS. 3A and 3B. Namely, the optical beam array formed of the eight optical beams is divided into a first group composed of the adjacent optical beams $81_5$ to $81_8$ in the sub-scanning direction and a second group composed of the adjacent optical beams $81_1$ to $81_4$ in the sub-scanning direction. The single liquid crystal deflecting element 70 is caused to act on the optical beams $81_5$ to $81_8$ in the first group. Namely, as illustrated in FIG. 4B, predetermined drive voltages are input to the liquid crystal deflecting element 70, thereby causing the liquid crystal deflecting element 70 to deflect the optical beams $81_5$ to $81_8$ in the first group towards the direction of the optical beams $81_1$ to $81_4$ in the second group.

At this time, the drive voltages to be input to the liquid crystal deflecting element 70 are determined so that the irradiation positions of the optical beams $81_1$ to $81_4$ in the second group and the deflected optical beams $81_5{}^+$ to $81_8{}^+$ in the first group on a surface to be scanned are alternately arranged at regular intervals. For example, the drive voltages are determined so that the optical beam $81_5$ in the first group irradiates midway between the optical beams $81_1$ and $81_2$ in the second group. Since the other optical beams $81_6$ to $81_8$ in the first group are deflected by the same amount of deflection as the optical beam $81_5$ by the liquid crystal deflecting element 70, an optical beam array that the deflected optical beams $81_5{}^+$ to $81_8{}^+$ in the first group and the optical beams $81_1$ to $81_4$ in the second group are alternately arranged at regular intervals of the one-half pitch of the pitch in the optical array before the deflection is formed.

Also in this case, as can be seen from FIG. 4B, the order of the optical beams after the deflection changes from that before the deflection. In the example shown in FIG. 4B, the order of ch1, ch2, ch3, ch4, ch5, ch6, ch7, and ch8, the order of the channels before the deflection, is changed to the order of ch1, ch5, ch2, ch6, ch3, ch7, ch4, and ch8 after the deflection. Therefore, to keep the order of image data to be optically written on the surface to be scanned unchanged before and after the deflection, allocation of the image data to the channels ch1 to ch8 is changed for the deflection.

FIG. 5 is a flowchart conceptually illustrating an example of a beam-pitch switching process according to the present first embodiment. Each step in the flowchart is executed, for example, by a control unit that controls an image forming apparatus equipped with the liquid crystal deflecting element 70. First, at Step S101, whether or not to switch the pitch of optical beams is determined. For example, a specified scan density is compared with a scan density in a default state in which the liquid crystal deflecting element 70 is not activated with respect to the optical beams, and if the specified scan density is different from the scan density in the default state, it is determined to switch the beam pitch.

If it is determined not to switch the beam pitch, the liquid crystal deflecting element does not deflect the optical beams (Step S103), and the process moves onto Step S104, and an optical writing process is initiated. Namely, LDs are driven based on image data, and irradiates a surface to be scanned with laser beams.

On the other hand, at Step S101, if the specified scan density is different from the scan density of the optical beams in the default state, and it is determined to switch the beam pitch, the process moves onto Step S102. At Step S102, depending on the specified scan density, the liquid crystal deflecting element 70 deflects the optical beams as described above.

For example, if the specified scan density is twice as high as the scan density of the optical beams in the default state, as described above, a plurality of optical beams are divided into two groups each composed of more or less the same number of adjacent optical beams in the sub-scanning direction. Then, the liquid crystal deflecting element 70 is caused to act on the optical beams in one of the groups, and the optical beams in the one group are deflected toward a beam array of the optical beams in the other group. At this time, the deflection is performed so that the irradiation positions of the optical beams in the one group and the optical beams in the other group on a surface to be scanned are alternately arranged at regular intervals, and a beam array of the optical beams of which the scan density is twice as high as that of the beam array before the deflection is obtained.

After the optical beams are deflected at Step S102, the process moves onto Step S104, and an optical writing process on the surface to be scanned is performed with the array of the optical beams after the deflection.

In this manner, according to the present first embodiment, a plurality of optical beams are divided into two groups composed of adjacent optical beams in the sub-scanning direction, and the optical beams in one of the groups are collectively deflected by the action of the liquid crystal deflecting element 70, thereby switching the pitch of the optical beams; therefore, with one set of drive voltages, the pitch of a plurality of optical beams can be switched.

Incidentally, in the above, the examples of four optical beams and eight optical beams are explained; however, it is not limited to these examples. Namely, the first embodiment is applicable as long as the number of optical beams is four or more.

Figure 6A:
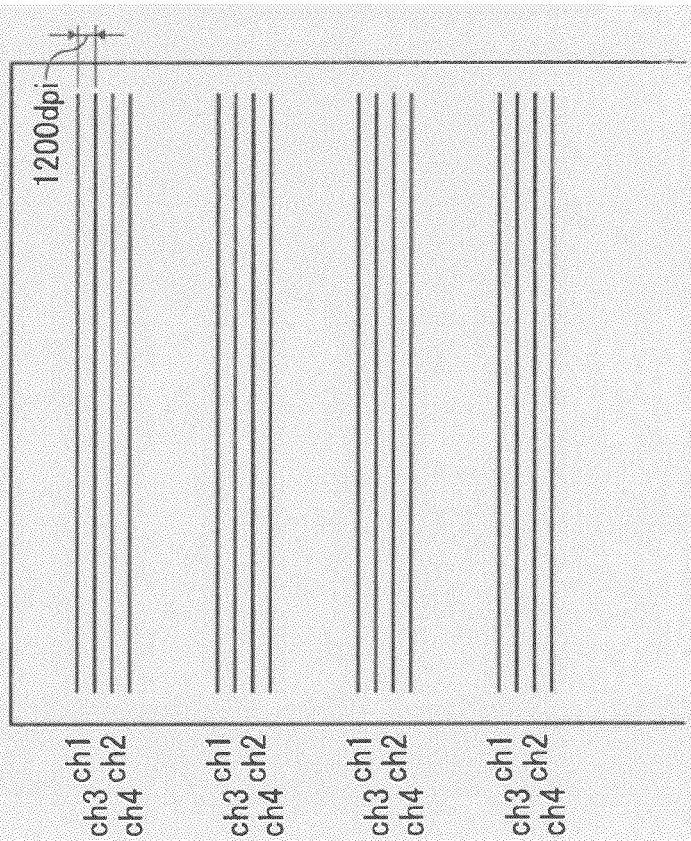
FIGS. 6A and 6B are schematic diagrams for explaining that a portion, where the intervals of main scanning lines in a sub-scanning direction are not uniform, is generated when a scan density is switched by deflecting optical beams.
Figure 6B:
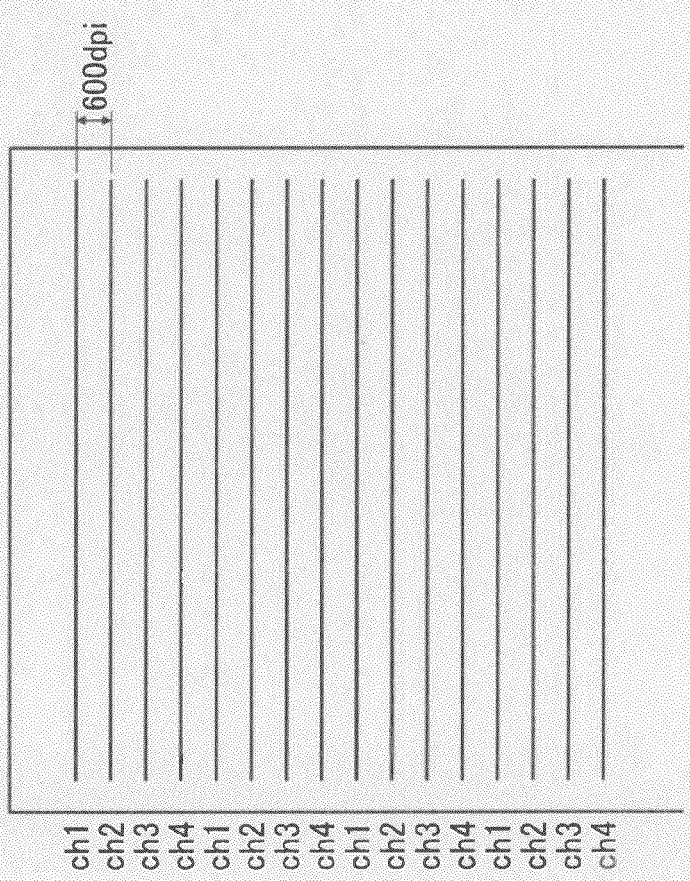

In the present first embodiment, when the scan density is switched from 600 dpi to 1200 dpi by causing the liquid crystal deflecting element 70 to deflect optical beams, generated is a portion where the intervals of main scanning lines in the sub-scanning direction are not uniform. For example, as illustrated in FIG. 6A, before the deflection of the optical beams, main scanning is performed at regular intervals with respect to the sub-scanning direction, and the intervals of main scanning lines in the sub-scanning direction are uniform. On the other hand, for example, when the optical beams of the channels ch3 and ch4 are deflected by the liquid crystal deflecting element 70, the optical beams of the channels ch3 and ch4 move to the side of the optical beams of the channels ch1 and ch2. As a result, as illustrated in FIG. 6B, in each cycle of a plurality of optical beams emitted for one-time main scanning, a gap is generated in the sub-scanning direction.

Consequently, in accordance with the sub-scanning pitch, the linear velocity of main scanning with respect to the surface to be scanned (a photosensitive drum) or the rotation speed of a polygon mirror is switched, so that the intervals of main scanning lines in the sub-scanning direction can be made uniform. For example, when the scan density is doubled (the sub-scanning pitch is reduced to one-half), the rotation speed of the polygon mirror is doubled, or the linear velocity of main scanning with respect to the photosensitive drum is reduced to one-half. By doing this, the intervals of main scanning lines in the sub-scanning direction can be made uniform.

Second Embodiment

Subsequently, a second embodiment of the present invention is explained. In the first embodiment described above, only one-stage deflection of optical beams by the liquid crystal deflecting element is performed; however, it is not limited to this example. In the second embodiment, multi-stage deflection of optical beams by the liquid crystal deflecting element is performed. By the multi-stage deflection, with respect to the scan density of optical beams in the default state, i.e., optical beams which are not deflected by the liquid crystal deflecting element, a higher scan density can be achieved. For example, when n number of liquid crystal deflecting elements are provided, and the n-stage deflection is performed, $2^n$ times as high scan density as the scan density in the default state can be obtained. In this case, at most n different values of drives voltages are required.

Figure 7A:
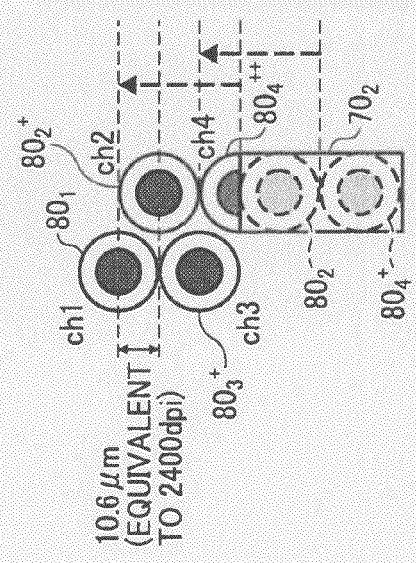
FIGS. 7A to 7C are schematic diagrams illustrating an example where a second embodiment of the present invention is applied to a multi-beam emitting source that emits four optical beams.
Figure 7B:
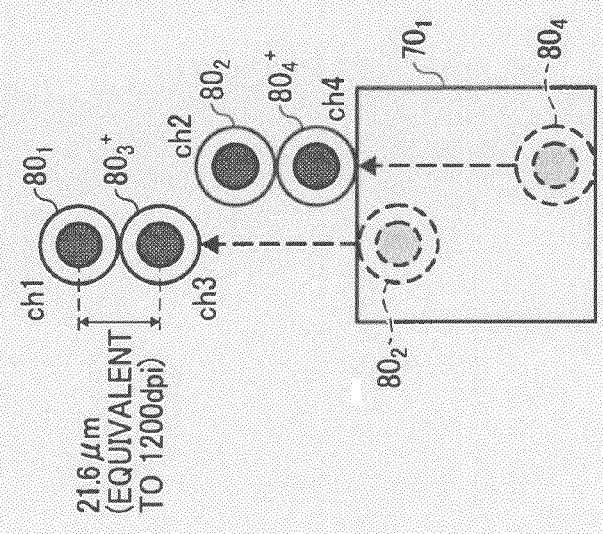
Figure 7C:
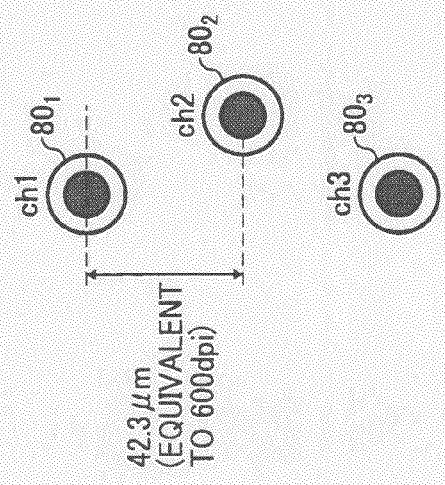

FIGS. 7A to 7C illustrate examples where the second embodiment is applied to a multi-beam emitting source that emits four optical beams. Here, as illustrated in FIG. 7A, an optical beam array composed of four optical beams $80_1$ to $80_4$, which are emitted in the sub-scanning direction at a pitch of 42.3 micrometers, equivalent to a scan density of 600 dpi and correspond to channels ch1 to ch4 respectively, is formed on a surface to be scanned.

In the second embodiment, optical beams, which have once deflected by a liquid crystal deflecting element, are further deflected by another liquid crystal deflecting element. First, as illustrated in FIG. 7B, the first-stage deflection is performed with a liquid crystal deflecting element $70_1$. In the same manner as in the first embodiment described above, the four optical beams $80_1$ to $80_4$ are divided into a first group composed of the adjacent optical beams $80_3$ and $80_4$ in the sub-scanning direction and a second group composed of the adjacent optical beams $80_1$ and $80_2$ in the sub-scanning direction. By the same process as that explained above with reference to FIG. 3B, the first liquid crystal deflecting element $70_1$ is caused to deflect the optical beams $80_3$ and $80_4$ in the first group, and as illustrated in FIG. 7B an array of the optical beams of which the scan density is twice as high as the scan density of the optical beams in the default state is obtained.

Then, the array of the optical beams obtained through the first-stage deflection is further divided into two groups, each composed of adjacent optical beams in the sub-scanning direction. In the example shown in FIG. 7B, the array of the optical beams obtained through the first-stage deflection is divided into a third group composed of the optical beams $80_2$ and $80_4^+$ and a fourth group composed of the optical beams $80_1$ and $80_3^+$.

Then, the second-stage deflection is performed with a liquid crystal deflecting element $70_2$. Drive voltages to be input into the liquid crystal deflecting element $70_2$ are determined so that the second liquid crystal deflecting element $70_2$ is caused to act on the optical beams $80_2$ and $80_4^+$ in the third group, and the irradiation positions of the optical beams $80_1$ and $80_3^+$ in the fourth group and the deflected optical beams $80_2^+$ and $80_4^{++}$ in the third group on the surface to be scanned are alternately arranged at regular intervals as illustrated in FIG. 7C.

For example, the drive voltages are determined so that the optical beam $80_2$, which is the closer optical beam to the fourth group out of the optical beams in the third group, irradiates midway between the optical beams $80_1$ and $80_3^+$ in the fourth group. The other optical beam $80_4^+$ in the third group is deflected by the same amount of deflection as the optical beam $80_2$. Consequently, an optical beam array of the optical beams $80_1$, $80_2^+$, $80_3^+$, and $80_4^{++}$ arranged in this order at regular intervals of the one-half pitch of the pitch in the optical beam array just before the first-stage deflection is formed. In the example shown in FIG. 7C, the pitch of the optical beams after the second-stage deflection is 10.6 micrometers, equivalent to a scan density of 2400 dpi that is one-quarter (¼) of the pitch in the default state.

In this case, as can be seen from FIG. 7C, the order of the optical beams just before the first-stage deflection is identical to that of after the second-stage deflection, so it is not necessary to change the allocation of image data to the channels ch1 to ch4.

Incidentally, in FIG. 7C and other similar drawings and the explanation described below, "+" is added to a reference sign of an optical beam subjected to one-stage deflection, and "++" is added to a reference sign of an optical beam subjected to two-stage deflection.

FIGS. 8A to 8C illustrate examples where the second embodiment is applied to a multi-beam emitting source that emits eight optical beams. Here, as illustrated in FIG. 8A, an optical beam array composed of eight optical beams $81_1$ to $81_8$, which are emitted in the sub-scanning direction at a pitch of 42.3 micrometers equivalent to a scan density of 600 dpi and correspond to channels ch1 to ch8 respectively, is formed on a surface to be scanned.

The case of eight optical beams is similar to the case of four optical beams described above. First, as illustrated in FIG. 8B, the first-stage deflection is performed with the first liquid crystal deflecting element $70_1$. Namely, the eight optical beams $81_1$ to $81_8$ are divided into a first group composed of the adjacent optical beams $81_5$ to $81_8$ in the sub-scanning direction and a second group composed of the adjacent optical beams $81_1$ to $81_4$ in the sub-scanning direction. Then, by the same process as that explained above with reference to FIG. 4B, the first liquid crystal deflecting element $70_1$ is caused to deflect the optical beams $81_5$ to $81_8$ in the first group, and as illustrated in FIG. 8B an array of the optical beams is obtained, of which the scan density becomes twice as high as the scan density of the optical beams in the default state through the first-stage deflection.

Then, the array of the optical beams obtained through the first-stage deflection is further divided into two groups, each composed of adjacent optical beams in the sub-scanning direction. In the example shown in FIG. 8B, the array of the optical beams, obtained through the first-stage deflection, is divided into a third group composed of the optical beams $81_3$, $81_7^+$, $81_4$, and $81_8^+$ and a fourth group composed of the optical beams $81_1$, $81_5^+$, $81_2$, and $81_6^+$.

Then, the second-stage deflection is performed with the second liquid crystal deflecting element $70_2$. Drive voltages to be input to the liquid crystal deflecting element $70_2$ are determined so that the second liquid crystal deflecting element $70_2$ is caused to act on the optical beams $81_3$, $81_4$, $81_7^+$, and $81_8^+$ in the third group and the irradiation positions of the optical beams $81_1$, $81_5^+$, $81_2$, and $81_6^+$ in the fourth group and the deflected optical beams $81_3^+$, $81_7^{++}$, $81_4^+$, and $81_8^{++}$ in the third group on the surface to be scanned are alternately arranged at regular intervals as illustrated in FIG. 8C.

For example, in the same manner as in the case of four optical beams described above, the drive voltages are determined so that the optical beam $81_3$, which is the closest optical beam to the fourth group out of the optical beams in the third group, irradiates midway between the optical beams $81_1$ and $80_5^+$, which is a set of the optical beams farthest from the third group out of the optical beams in the fourth group. The other optical beams $81_7^+$, $81_4$, and $81_8^+$ in the third group are deflected by the same amount of deflection as the optical beam $81_3$. Consequently, an optical beam array of the optical beams $80_1$, $81_3^+$, $81_5^+$, $81_7^{++}$, $81_2$, $81_4^+$, $81_3^{++}$, and $81_6^+$ arranged in this order at regular intervals of the one-half pitch of the pitch in the optical beam array obtained through the first-stage deflection, i.e., the one-quarter (¼) pitch of the pitch in the default state is formed (see FIG. 8C).

In this case, as can be seen from FIG. 8C, the order of the optical beams after the second-stage deflection is different from that in the default state, so it is necessary to change the allocation of image data to the channels ch1 to ch8.

In this manner, according to the second embodiment, a plurality of optical beams are divided into two groups composed of adjacent optical beams in the sub-scanning direction, and the first-stage deflection is performed on the optical beams in one of the groups collectively by causing the first liquid crystal deflecting element $70_1$ to act on the optical beams in the one group. Then, the optical beams subjected to the first-stage deflection are divided into two groups composed of adjacent optical beams in the sub-scanning direction, and the second-stage deflection is performed on the optical beams in one of the groups collectively by causing the second liquid crystal deflecting element $70_2$ to act on the optical beams in the one group. Therefore, with two sets of drive voltages, the pitch of a plurality of optical beams can be switched to the one-quarter (¼) pitch of the pitch in the default state.

Incidentally, the process described above with reference to the flowchart shown in FIG. 5 for the first embodiment can be applied to a beam-pitch switching process according to the second embodiment. Namely, a specified scan density is compared with the scan density in the default state, and whether or not to switch the beam pitch is determined (Step S101). If it is determined that the specified scan density is identical to the scan density in the default state, the beam pitch is not switched, and the process moves onto Step S103, i.e., optical beams are not deflected by the liquid crystal deflecting elements $70_1$ and $70_2$, and then, at Step S104, an optical writing process is initiated.

On the other hand, at Step S101, if it is determined that the specified scan density is different from the scan density in the default state, the process moves onto Step S102. At Step S102, depending on the specified scan density, the liquid crystal deflecting element $70_1$ or both the liquid crystal deflecting elements $70_1$ and $70_2$ are driven to deflect the optical beams. Then, at Step S104, an optical writing with the optical beams subjected to the deflection is performed.

Furthermore, in the above, the examples of four optical beams and eight optical beams are explained; however, it is not limited to these examples. Namely, in the same manner as in the first embodiment described above, the second embodiment is applicable as long as the number of optical beams is four or more.

Moreover, also in the second embodiment, when the scan density is switched from 600 dpi to 2400 dpi by causing the liquid crystal deflecting elements $70_1$ and $70_2$ to deflect optical beams, a portion, where the intervals of main scanning lines in the sub-scanning direction are not uniform, is generated. Therefore, also in the second embodiment, in accordance with the sub-scanning pitch, the linear velocity of main scanning with respect to the surface to be scanned (the photosensitive drum) or the rotation speed of the polygon mirror is switched, so that the intervals of main scanning lines in the sub-scanning direction can be made uniform. In the second embodiment, the pixel density is quadrupled (the sub-scanning pitch is reduced to one-quarter), so the rotation speed of the polygon mirror is quadrupled, or the linear velocity with respect to the photosensitive drum is reduced to one-quarter. By doing this, the intervals of main scanning lines in the sub-scanning direction can be made uniform.

Third Embodiment

Figure 9:
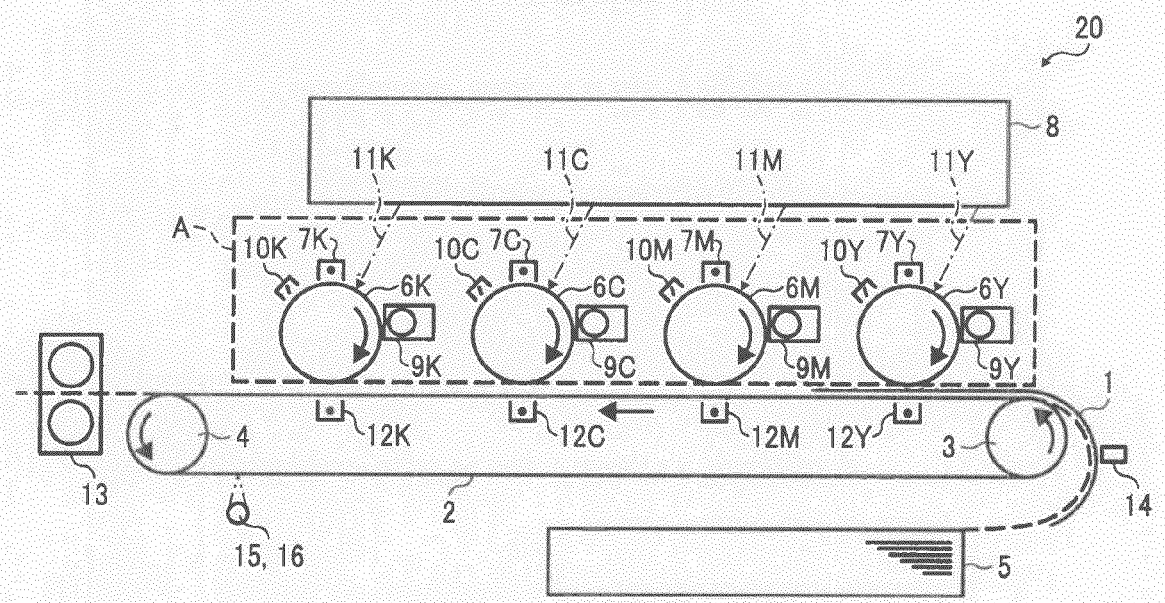
FIG. 9 is a schematic diagram illustrating a configuration of an example of an image forming apparatus applicable to a third embodiment of the present invention.

Subsequently, a third embodiment of the present invention is explained. The third embodiment is an example where the above first or second embodiment is applied to an image forming apparatus. FIG. 9 illustrates a configuration of an example of an image forming apparatus 20 applicable to the third embodiment. The image forming apparatus 20 is a tandem-type color image forming apparatus capable of forming a color image using yellow (Y), magenta (M), cyan (C), black (K) toners.

In the image forming apparatus 20, image forming units A for forming Y, M, C, and K color images are arranged to line up along a conveyance belt 2 for conveying a transfer sheet 1. The conveyance belt 2 is supported by conveyance rollers 3 and 4, and is driven to rotate in a direction of arrow shown in FIG. 9 by the rotation of the conveyance rollers 3 and 4. The conveyance rollers 3 and 4 are a set of a drive roller and a driven roller; the drive roller is driven to rotate, and the driven roller rotates in accordance with the rotation of the drive roller.

A sheet tray 5 in which transfer sheets 1 are contained is provided below the conveyance belt 2. At the time of forming an image, the top transfer sheet out of the transfer sheets 1 contained in the sheet tray 5 is fed, and in mid-course of the feeding of the transfer sheet 1, attracted onto the conveyance belt 2 by the action of electrostatic attraction at a timing determined by a registration sensor 14, i.e., a timing along with the operation of an optical unit for writing an image.

The attracted transfer sheet 1 is conveyed to a first image forming unit for forming a Y-color image, and a Y-color image is formed on the transfer sheet 1 in the first image forming unit. The first image forming unit includes as components a photosensitive drum 6Y and a charger 7Y, an exposure device 8, a developing unit 9Y, a photosensitive-drum cleaning unit 10Y, and the like which are arranged around the photosensitive drum 6Y. After the surface of the photosensitive drum 6Y is uniformly charged by the charger 7Y, the photosensitive drum 6Y is exposed to a laser light 11Y corresponding to the Y-color image by the exposure device 8, and an electrostatic latent image is formed thereon.

Incidentally, the electrostatic latent image is formed by the main and sub-scanning method of optical beam writing. The scanning by a beam emitted from the exposure device 8 is referred to as main scanning, and the rotation of the photosensitive drum perpendicular to the main scanning is referred to as sub-scanning. The photosensitive surface of the drum is exposed to an optical beam corresponding to a two-dimensional image by the main and sub-scanning method, whereby an electrostatic latent image is formed on the surface of the photosensitive drum.

The electrostatic latent image formed on the surface of the photosensitive drum 6Y is developed into a Y-toner image by the developing unit 9Y. Namely, the Y-toner image is formed on the photosensitive drum 6Y. The Y-toner image on the photosensitive drum 6Y is transferred onto the transfer sheet 1 by a transfer unit 12Y at the position where the photosensitive drum 6Y comes in contact with the transfer sheet 1 on the conveyance belt 2 (the transfer position), and a Y-color image is formed on the transfer sheet. After the Y-toner image is transferred onto the transfer sheet 1, unwanted toner remaining on the surface of the photosensitive drum 6Y is cleaned by the photosensitive-drum cleaning unit 10Y to prepare for next image formation.

The transfer sheet 1 on which the Y-toner image is formed in the first image forming unit is conveyed to a second image forming unit for forming an M-color image along with the movement of the conveyance belt 2. In the second image forming unit, in the same manner as in the first image forming unit described above, an M-toner image is formed on a photosensitive drum 6M, and transferred onto the transfer sheet 1 so as to be superimposed on the already-formed Y-toner image. The transfer sheet 1 is next conveyed to a third image forming unit for forming a C-color image and then conveyed to a fourth image forming unit for forming a K-color image, and, in the same manner as the cases of the Y and M color images described above, the formed C and K toner images are transferred onto the transfer sheet 1 so as to be superimposed onto the last-formed toner image. When the Y, M, C, and K toner images have been transferred onto the transfer sheet 1, a color image is formed on the transfer sheet 1.

The transfer sheet 1 on which the color image is formed exits from the fourth image forming unit, and is detached from the conveyance belt 2; and then conveyed to a fixing unit 13. In the fixing unit 13, the color image is fixed on the transfer sheet 1, and after that, the transfer sheet 1 is discharged out of the apparatus.

Reflective detection sensor elements 15 and 16 are provided with a distance L so as to correspond to both ends of the conveyance belt 2 in the main scanning direction. The image forming apparatus 20 forms a series of patches and a series of toner marks in each color of toner on the conveyance belt 2 before forming the color image on the transfer sheet 1. The formed series of patches is detected by the detection sensor elements 15 and 16, and the image density is controlled on the basis of a change in a value of voltage detected. Furthermore, the formed series of toner marks is detected by the detection sensor elements 15 and 16, and the position of the series of toner marks is determined from a change in a value of voltage detected, and the alignment of Y, M, C, and K toner images is made.

Incidentally, although it is not illustrated in the drawing, a cleaning unit for cleaning a toner image composing the series of patches and the series of toner marks is provided at a predetermined position on the rear side of the conveyance belt 2 in the traveling direction with respect to the positions where the detection sensor elements 15 and 16 are provided.

Figure 10:
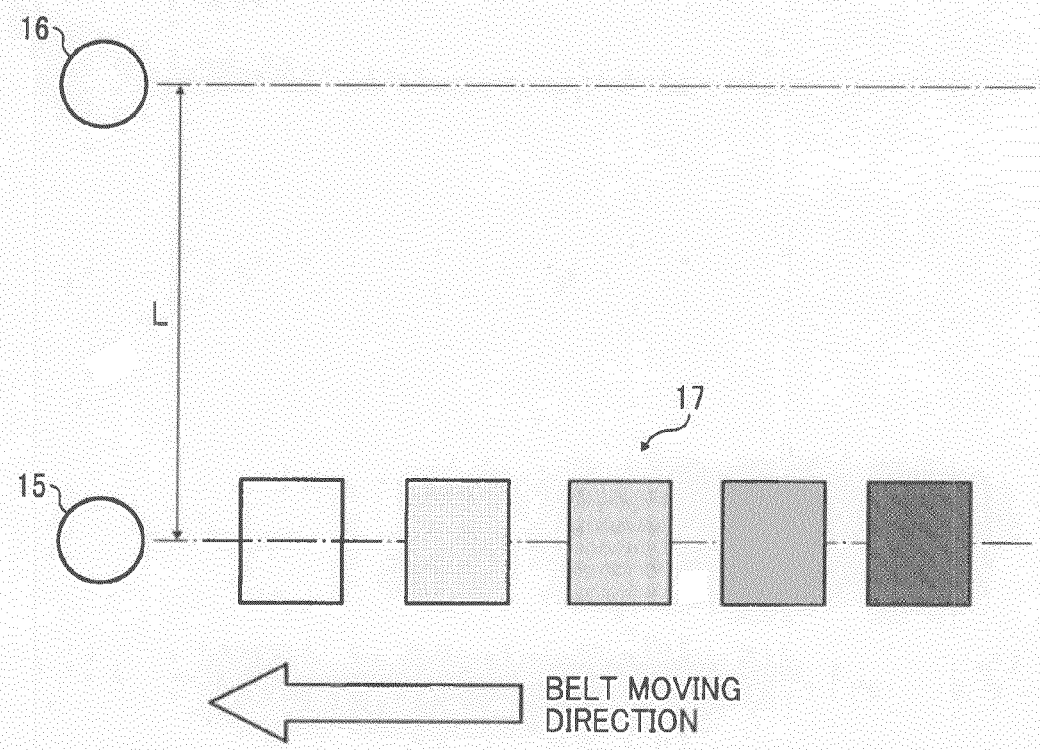
FIG. 10 is a schematic diagram illustrating an example of a series of toner color patches formed on a conveyance belt.

FIG. 10 illustrates an example of a series of toner color patches 17 formed on the conveyance belt 2. Incidentally, in FIG. 10, only a series of K-toner color patches 17 is illustrated. The series of patches 17 in a plurality of tones in each color of K, C, M, and Y toners is formed at a position on the conveyance belt 2 corresponding to either one of the detection sensor elements 15 and 16 (in this example, the detection sensor element 15).

By detecting the series of patches with the detection sensor element 15, the image density can be controlled appropriately. The control of the density is made by setting, for example, the intensity of the laser light 11 or a bias value of the developing unit 9. An executive instruction for the calculation and correction of a density value is made by a central processing unit (CPU) (not shown). By correcting the density and the bias value, the nonlinearity as characteristics of an LD that emits the laser light 11 and the nonlinearity of a relationship between the developing bias and the density are corrected. The formation and detection of a series of patches in each color of Y, M, C, and K toners and the settings for controlling the density are performed with respect to each of the Y, M, C, and K toners in a time sequence.

Figure 11:
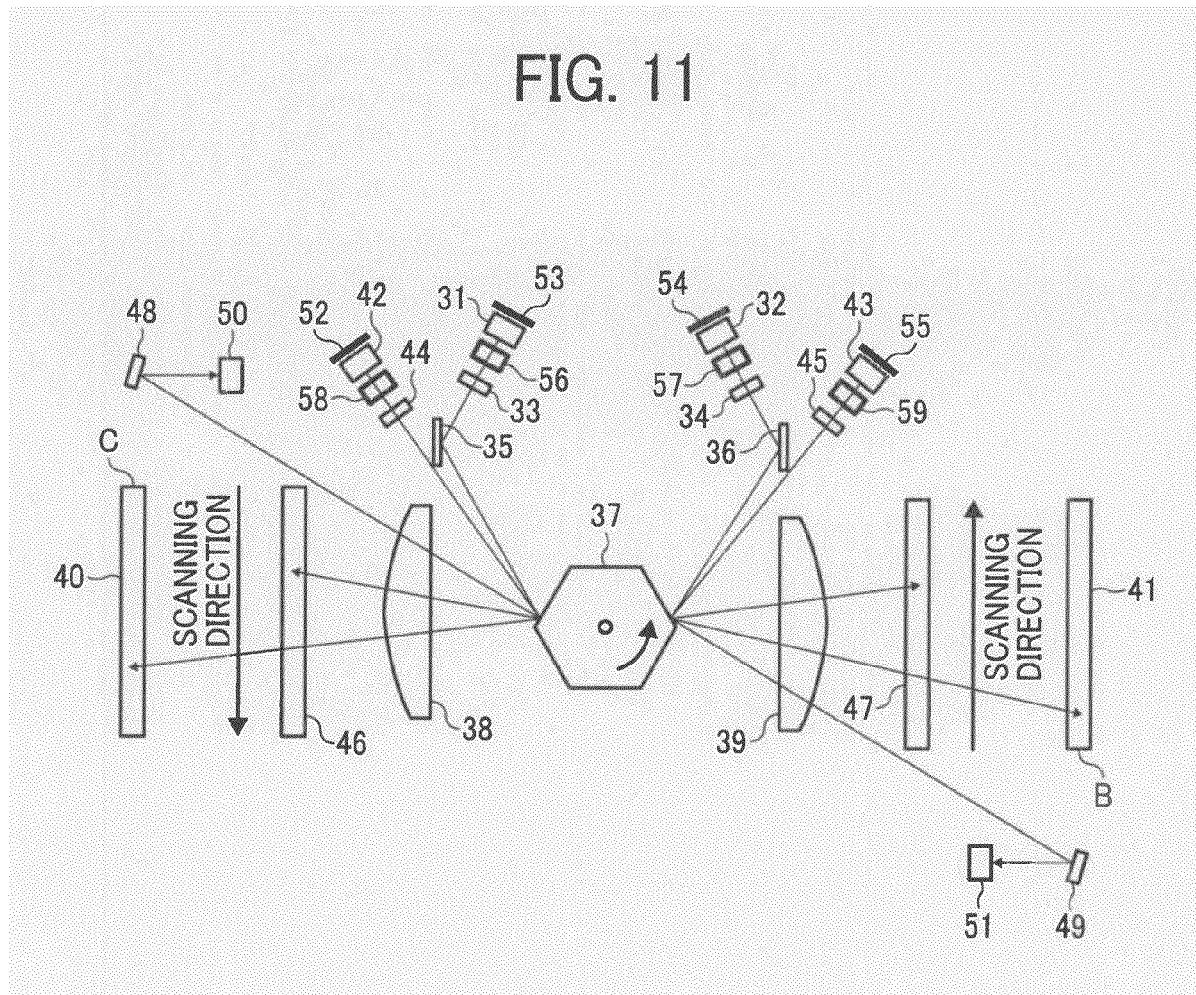
FIG. 11 is a schematic diagram illustrating an example of an optical unit composing an exposure device in the image forming apparatus.

FIG. 11 illustrates an example of an optical unit composing the exposure device 8 included in the image forming apparatus 20 shown in FIG. 9. Incidentally, FIG. 11 corresponds to an overhead view shown in FIG. 9. An LD unit K31 is provided with an LD control board 53, and the LD control board 53 is equipped with an LD. Likewise, each of LD control boards 54, 52, and 55, provided to LD units Y32, C42, and M43 respectively, is equipped with an LD. The respective LDs of the LD units each emit an optical beam required to expose the photosensitive surface of the corresponding photosensitive drum for each color.

In the present embodiment, one LD unit is equipped with a plurality of LDs, such as an LD array, and has a multi-beam configuration capable of emitting a plurality of optical beams at a time. With respect to the LD units K31, Y32, C42, and M43, liquid crystal deflecting elements 56, 57, 58, and 59 for adjusting the beam pitch of multiple beams emitted from each LD unit respectively are arranged on respective optical paths. The adjustment of the beam pitch by the liquid crystal deflecting element will be described in detail later.

Optical beams emitted from the LD unit K31 pass through the liquid crystal deflecting element 56 and a cylindrical lens CYL_K33, and is reflected by a reflection mirror K35, and then fall on a lower surface of a polygon mirror 37 being rotating at a constant speed. Likewise, optical beams emitted from the LD unit Y32 pass through the liquid crystal deflecting element 57 and a cylindrical lens CYL_Y34, and is reflected by a reflection mirror Y36, and then fall on a lower surface of the polygon mirror 37. The optical beams which have been emitted from the LD units K31 and Y32 and have fallen on the polygon mirror 37 are deflected in accordance with the rotation of the polygon mirror 37, and, respectively, pass through f-theta lenses KC38 and YM39, and are turned by first mirrors K40 and Y41, and then scan the corresponding surfaces to be scanned (main scanning).

Optical beams emitted from the LD unit C42 pass through the liquid crystal deflecting element 58 and a cylindrical lens CYL_C44, and fall on an upper surface of the polygon mirror 37. Likewise, optical beams emitted from the LD unit M43 pass through the liquid crystal deflecting element 59 and a cylindrical lens CYL_M45, and fall on an upper surface of the polygon mirror 37. The optical beams which have been emitted from the LD units C42 and M43 and have fallen on the polygon mirror 37 are deflected in accordance with the rotation of the polygon mirror 37, and, respectively, pass through the f-theta lenses KC38 and YM39, and are turned by first mirrors C46 and M47, and then scan the corresponding surfaces to be scanned in directions opposite to the scanning directions of the optical beams for K and Y color images (main scanning). The scanning direction of the optical beams for K and C color images and the scanning direction of the optical beams for Y and M color images are indicated by arrows in FIG. 11.

A cylindrical mirror CYM_KC48 is provided on the upstream side of a write start position C in the main scanning direction in the scanning direction, and a sensor KC50 is provided on an optical path of the optical beams for the K and C color images that are reflected by the cylindrical mirror CYM_KC48. Likewise, a cylindrical mirror CYM_YM49 is provided on the upstream side of a write start position B in the main scanning direction in the scanning direction, and a sensor YM51 is provided on an optical path of the optical beams for the Y and M color images that are reflected by the cylindrical mirror CYM_YM49.

The optical beams passing through the f-theta lenses KC38 and YM39, respectively, are reflected and collected by the cylindrical mirrors CYM_KC48 and CYM_YM49, and fall on the sensors KC50 and YM51. The sensors KC50 and YM51 each receive the optical beams for periodic scanning at a fixed position, thereby serving as a synchronous detection sensor for detecting a synchronous reference signal for synchronizing in the main scanning direction.

Furthermore, in this example, the cylindrical mirror CYM_KC48 and the sensor KC50 are shared for the optical beams from the LD units K31 and C42. Likewise, the LD units Y32 and M43 share the cylindrical mirror CYM_YM49 and the sensor YM51. In this manner, optical beams for two color images fall on the same synchronous detection sensor. Consequently, the optical beams for each color image are set to differ in angle of incident on the polygon mirror 37 between the optical beams for the two color images, whereby a timing when the optical beams for each color image fall on the synchronous detection sensor is different from each other, and the output of the synchronous detection sensor is output as a time-series pulse sequence, so that the optical beams for each color image can be recognized.

Figure 12:
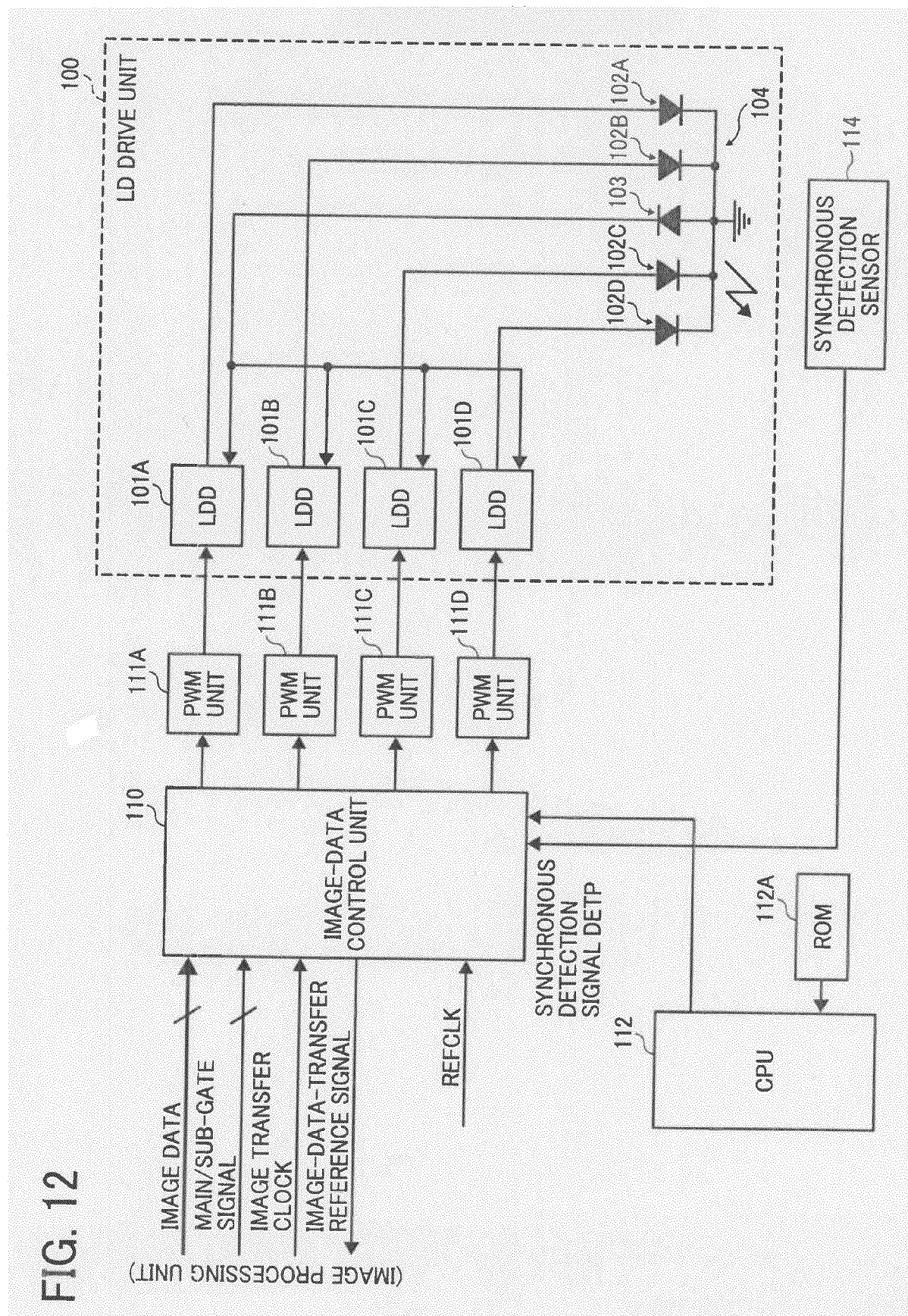
FIG. 12 a block diagram illustrating a configuration of an example of an LD drive control system in the image forming apparatus applicable to the third embodiment of the present invention.

FIG. 12 illustrates a configuration of an example of an LD drive control system in the image forming apparatus 20 applicable to the third embodiment. FIG. 12 illustrates an example of a 4-beam configuration capable of emitting four optical beams of channels ch1 to ch4 at a time. A CPU 112 controls the operation of the entire image forming apparatus 20 equipped with the drive control system, for example, in accordance with a program stored in a read-only memory (ROM) 112A or the like.

An image-data control unit 110 is supplied with image data for the four channels (four lines) from an image processing unit (not shown), and also supplied with an image transfer clock and a main/sub-gate signal. The main/sub-gate signal is a gate signal for the main scanning and sub-scanning.

The image-data control unit 110 stores the 4-channel image data supplied from the image processing unit in an internal line memory (not shown). The image-data control unit 110 reads out the 4-channel image data from the line memory along with the rotation timing of the polygon mirror 37, and supplies the read 4-channel image data to pulse-width modulating (PWM) units 111A, 111B, 111C, and 111D respectively. A reference clock REFCLK is a clock used as the basis of the operation of the image-data control unit 110.

More specifically, being based on a timing when a synchronous detection signal DETP is supplied from a synchronous detection sensor 114 corresponding to the sensor KC50 or YM51 in FIG. 11, the image-data control unit 110 reads out the 4-channel image data from the line memory in synchronization with the image transfer clock supplied from the image processing unit, and supplies the read 4-channel image data to the PWM units 111A to 111D respectively. Furthermore, the image-data control unit 110 generates an image-data-transfer reference signal for informing the image processing unit of a timing of image data transfer so as to supply the generated image-data-transfer reference signal to the image processing unit.

The PWM units 111A to 111D perform pulse-width modulation on the basis of the image data supplied from the image-data control unit 110. Modulation signals of the channels ch1 to ch4 that the image data is subjected to the pulse-width modulation are supplied to laser diode drivers (LDDs) 101A to 101D of an LD drive unit 100, respectively.

The LD drive unit 100 corresponds to the LD unit K31, Y32, C42, or M43 in FIG. 11. The LD drive unit 100 includes the LDDs 101A, 101B, 101C, and 101D and an LD array 104. The LD array 104 includes LDs 102A, 102B, 102C, and 102D and a photodiode (PD) 103. The LDDs 101A to 101D respectively drive the LDs 102A to 102D in accordance with the modulation signals supplied from the PWM units 111A to 111D. The LDs 102A to 102D respectively emit laser beams (optical beams) in response to the modulation drive. The PD 103 receives the optical beams emitted from each of the LDs 102A to 102D, and outputs a light-receiving signal depending on the light intensity of the received optical beams. The LDDs 101A to 101D perform the feedback control with respect to the modulation drive of the LDs 102A to 102D on the basis of the light-receiving signal output from the PD 103.

Incidentally, in the example shown in FIG. 12, multiple beams are obtained by using the LD array 104; however, it is not limited to this example, and multiple beams can be obtained by using four separate LDs.

Figure 13:
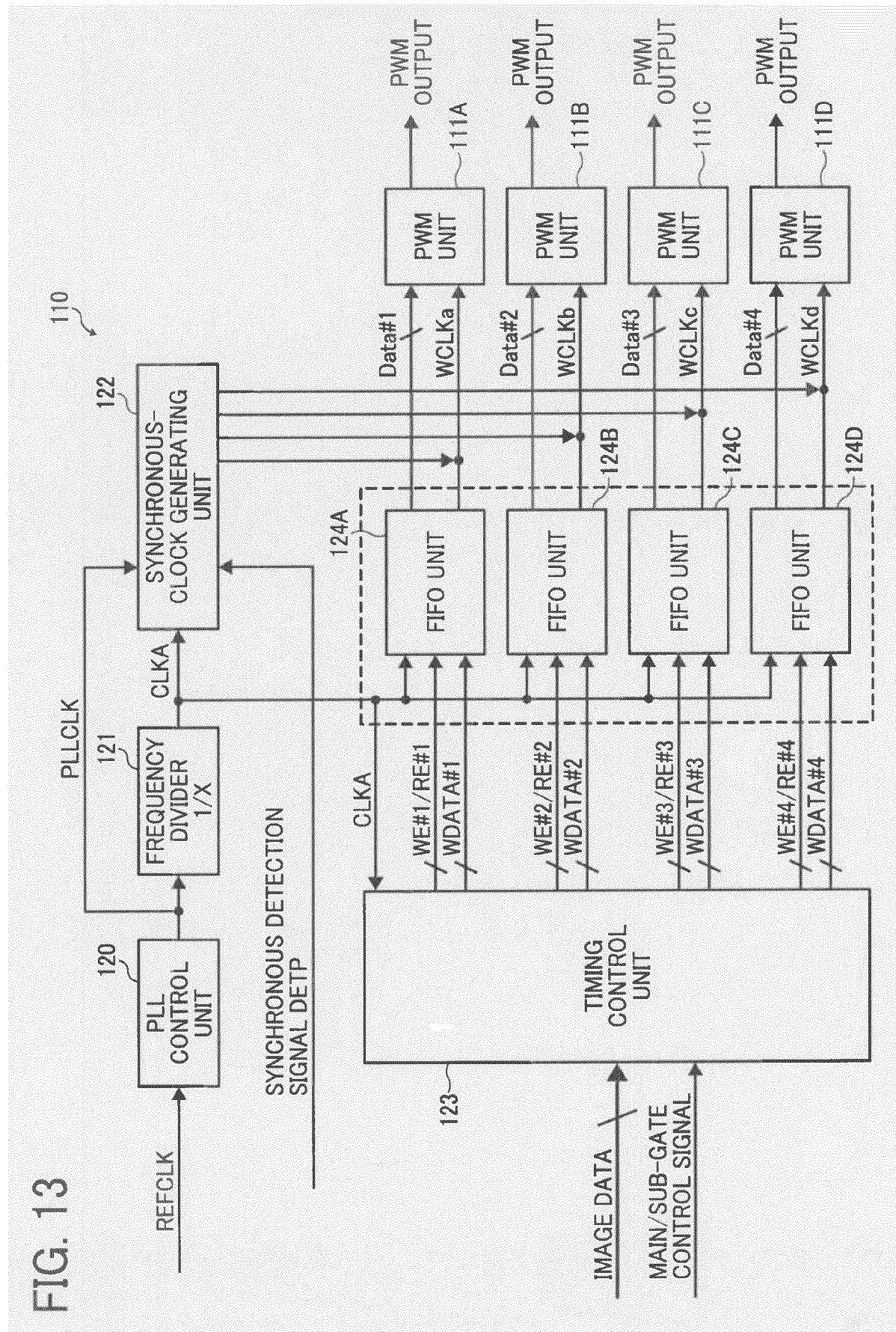
FIG. 13 is a block diagram illustrating a configuration of an example of an image-data control unit.

FIG. 13 illustrates a configuration of an example of the image-data control unit 110. The image-data control unit 110 includes a phase-locked loop (PLL) control unit 120, a frequency divider 121, a synchronous-clock generating unit 122, and a timing control unit 123, and further includes FIFO units 124A, 124B, 124C, and 124D for the channels of image data.

The PLL control unit 120 includes a voltage-controlled oscillator (VCO) internally, and generates an oscillation clock PLLCLK by multiplying the reference clock REFCLK supplied from the image processing unit (not shown) by using the VCO. The generated oscillation clock PLLCLK is supplied to the frequency divider 121 and the synchronous-clock generating unit 122. The frequency divider 121 generates a frequency-divided clock CLKA by dividing the frequency of the supplied oscillation clock PLLCLK by X. The frequency-divided clock CLKA is supplied to the synchronous-clock generating unit 122. The synchronous-clock generating unit 122 is further supplied with the synchronous detection signal DETP. Furthermore, the frequency-divided clock CLKA is also supplied to the timing control unit 123 and the FIFO units 124A to 124D.

The synchronous-clock generating unit 122 generates write clocks WCLKa, WCLKb, WCLKc, and WCLKd for controlling the timings of optical writing by the LDs 102A to 102D in the LD array 104 on the basis of the oscillation clock PLLCLK and the frequency-divided clock CLKA. The generated write clocks WCLKa, WCLKb, WCLKc, and WCLKd are supplied to the PWM units 111A to 111D respectively.

And also, the write clocks WCLKa, WCLKb, WCLKc, and WCLKd are supplied to the FIFO units 124A to 124D respectively.

The timing control unit 123 is supplied with the above-described frequency-divided clock CLKA, and also supplied with the image data from the image processing unit (not shown) and a main/sub-gate control signal for controlling the main scanning and sub-scanning. The timing control unit 123 separates the supplied image data into image data WDATA#1, image data WDATA#2, image data WDATA#3, and image data WDATA#4 for the channels ch1 to ch4, and stores the 4-channel image data WDATA#1 to WDATA#4 in a line memory (not shown) capable of storing therein image data for at least four channels (four lines).

Furthermore, the timing control unit 123 generates write enable signals WE#1, WE#2, WE#3, and WE#4 for instructing the respective timings of writing the image data WDATA#1 to WDATA#4 for the channels ch1 to ch4 to the FIFO units 124A to 124D on the basis of the frequency-divided clock CLKA and the main/sub-gate control signal.

And also, the timing control unit 123 generates read enable signals RE#1, RE#2, RE#3, and RE#4 for instructing the respective timings of reading out the image data WDATA#1 to WDATA#4 from the FIFO units 124A to 124D on the basis of the frequency-divided clock CLKA and the main/sub-gate control signal.

The timing control unit 123 writes the image data WDATA#1 to WDATA#4 to the FIFO units 124A to 124D at the timings indicated in the write enable signals WE#1 to WE#4, respectively. The image data WDATA#1 to WDATA#4 respectively are read out from the FIFO units 124A to 124D in synchronization with the write clocks WCLKa to WCLKd at the timings indicated in the read enable signals RE#1 to RE#4, and are supplied as write data Data#1, Data#2, Data#3, and Data#4 to the PWM units 111A to 111D.

Figure 14:
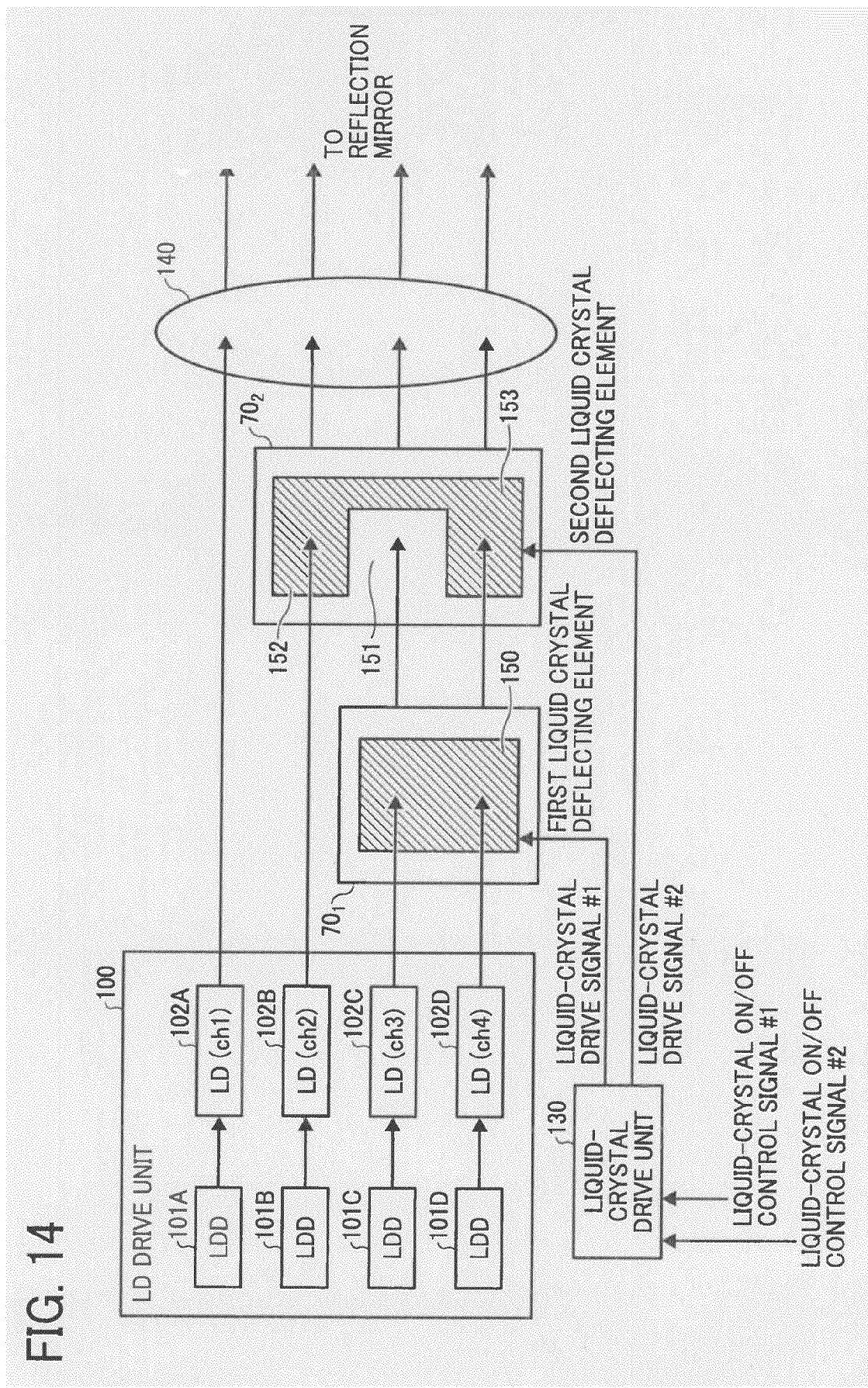
FIG. 14 is a schematic diagram illustrating a configuration example of liquid crystal deflecting elements for deflecting optical beams emitted from four LDs.

FIG. 14 illustrates a configuration example of liquid crystal deflecting elements for deflecting optical beams emitted from the four LDs 102A to 102D. Incidentally, in FIG. 14, portions in common with those shown in FIGS. 11 and 12 described above are denoted by the same reference numerals, so that the detailed description of those portions is omitted.

In the third embodiment, two-stage deflection as explained in the above second embodiment is performed, so the first liquid crystal deflecting element $70_1$ and the second liquid crystal deflecting element $70_2$ are arranged between the LD drive unit 100 and a cylindrical lens 140. The cylindrical lens 140 corresponds, for example, to a cylindrical lens 33 if the LD drive unit 100 corresponds to the LD unit K31 in FIG. 11.

Incidentally, FIG. 14 illustrates an example of the liquid crystal deflecting elements $70_1$ and $70_2$ each viewed from the direction of the optical axis of the optical beams. Furthermore, a shaded portion in the liquid crystal deflecting element $70_1$ is an optical-beam irradiation area 150 where the transparent electrodes 75, 75, . . . are formed.

Likewise, a shaded portion in the liquid crystal deflecting element $70_2$ is optical-beam irradiation areas 152 and 153 where the transparent electrodes 75, 75, . . . are formed. The optical-beam irradiation areas 152 and 153 are electrically connected to each other, and have about the same characteristics. On the other hand, an unirradiated area 151 in the liquid crystal deflecting element $70_2$ is an area composed of, for example, only a glass substrate where no electrode is formed. The transmittance of the unirradiated area 151 is about 100%.

Namely, when predetermined drive voltages are input to the liquid crystal deflecting elements $70_1$ and $70_2$, optical beams, which are incident on the optical-beam irradiation area 150 and the optical-beam irradiation areas 152 and 153, are deflected depending on the drive voltages; and an optical beam incident on the unirradiated area 151 goes through the unirradiated area 151 almost as it is.

The liquid crystal deflecting element $70_1$ is arranged just behind the LD drive unit 100, and the second liquid crystal deflecting element $70_2$ is arranged behind the liquid crystal deflecting element $70_1$. In the example shown in FIG. 14, the liquid crystal deflecting element $70_1$ for performing the first-stage deflection is configured so that respective optical beams emitted from the LDs 102C and 102D enter the optical-beam irradiation area 150.

On the other hand, the liquid crystal deflecting element $70_2$ for performing the second-stage deflection is configured so that the optical beam that has been emitted from the LD 102D and has passed through the liquid crystal deflecting element $70_1$ enters the optical-beam irradiation area 153, and the optical beam that has been emitted from the LD 102C and has passed through the liquid crystal deflecting element $70_1$ enters the unirradiated area 151. Furthermore, the liquid crystal deflecting element $70_2$ is configured so that an optical beam emitted from the LD 102B enters the optical-beam irradiation area 152.

Namely, the optical beam emitted from the LD 102D passes through the optical-beam irradiation area 150 of the liquid crystal deflecting element $70_1$ and the optical-beam irradiation area 153 of the liquid crystal deflecting element $70_2$, and enters the cylindrical lens 140. The optical beam emitted from the LD 102C passes through the optical-beam irradiation area 150 of the liquid crystal deflecting element $70_1$ and the unirradiated area 151 of the liquid crystal deflecting element $70_2$, and enters the cylindrical lens 140. The optical beam emitted from the LD 102B passes through the optical-beam irradiation area 152 of the liquid crystal deflecting element $70_2$, and enters the cylindrical lens 140. Furthermore, an optical beam emitted from the LD 102A directly enters the cylindrical lens 140. The optical beams that have entered the cylindrical lens 140 exit from the cylindrical lens 140 toward a reflection mirror (not shown).

A liquid-crystal drive unit 130 outputs a liquid-crystal drive signal #1 and a liquid-crystal drive signal #2, for example, in accordance with a liquid-crystal ON/OFF control signal #1 and a liquid-crystal ON/OFF control signal #2 which are supplied from the CPU 112. The activations of the liquid crystal deflecting elements $70_1$ and $70_2$ are controlled by the liquid-crystal drive signals #1 and #2 respectively. When the liquid crystal deflecting elements $70_1$ and $70_2$ are activated, and drive voltages are input to the liquid crystal deflecting elements $70_1$ and $70_2$, the liquid crystal deflecting elements $70_1$ and $70_2$ deflect incident optical beams; on the other hand, when the liquid crystal deflecting elements $70_1$ and $70_2$ are deactivated, no drive voltage is input to the liquid crystal deflecting elements $70_1$ and $70_2$, and the liquid crystal deflecting elements $70_1$ and $70_2$ do not deflect incident optical beams.

FIGS. 6A, 6B, 7A and 7B for the second embodiment described above illustrate that optical beams that have been deflected and moved by the liquid crystal deflecting element $70_1$, for scanning a predetermined position, enter the liquid crystal deflecting element $70_2$. The predetermined position to be scanned with the deflected optical beams is actually on a surface to be scanned beyond the cylindrical lens 140. Therefore, in front of the cylindrical lens 140, a change of the optical path of the optical beam due to the deflection is small, and as illustrated in FIG. 14 the optical beam deflected by the liquid crystal deflecting element $70_1$ can be assumed to take about the same optical path as that of the optical beams before being deflected.

Incidentally, if only one-stage deflection is performed as in the first embodiment, the liquid crystal deflecting element $70_2$ is not provided, and the liquid-crystal drive unit 130 outputs only the liquid-crystal drive signal #1.

Figure 15:
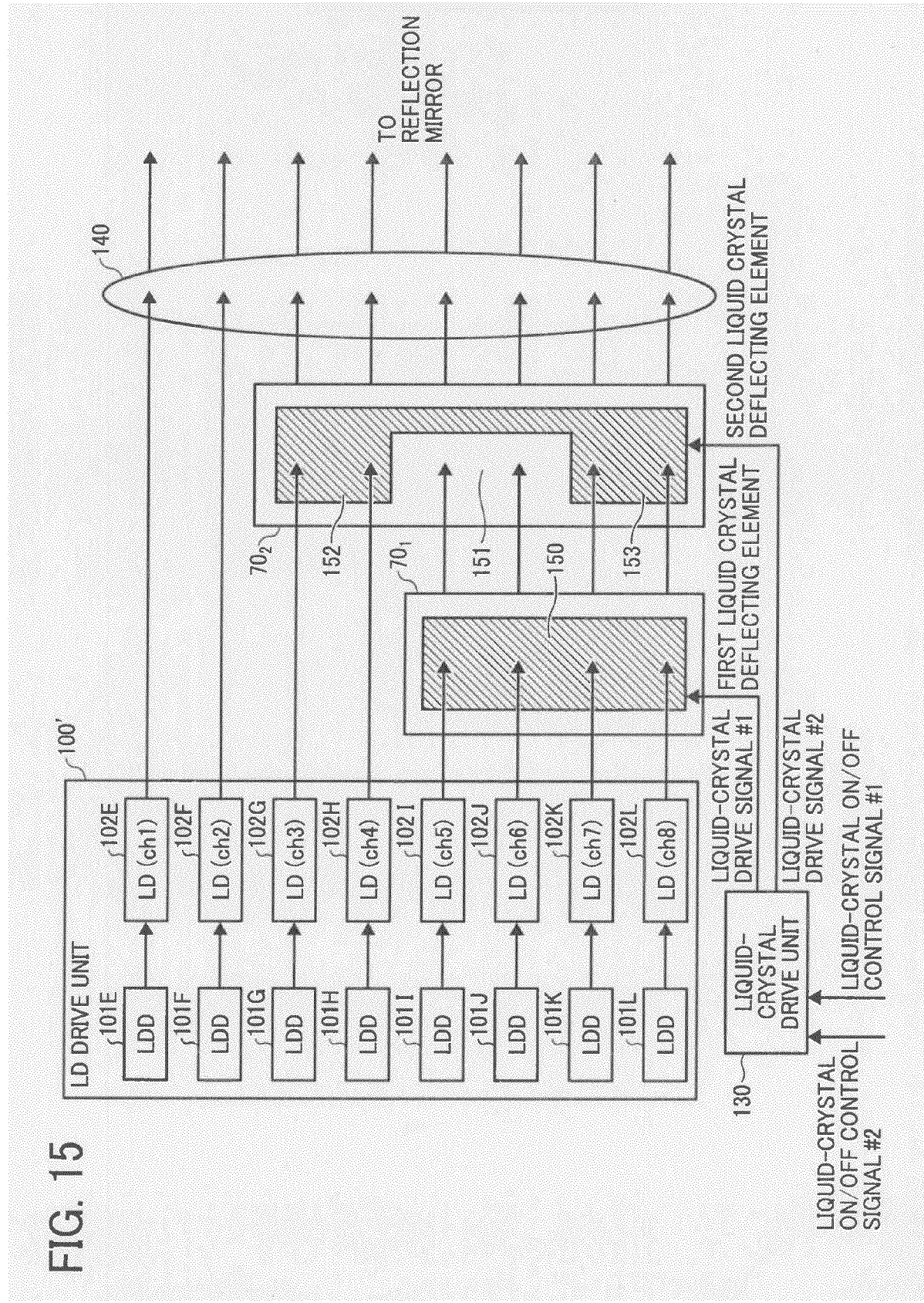
FIG. 15 is a schematic diagram illustrating a configuration example of liquid crystal deflecting elements for deflecting optical beams emitted from eight LDs.

FIG. 15 illustrates a configuration example of liquid crystal deflecting elements for deflecting optical beams emitted from eight LDs 102E to 102L. Incidentally in FIG. 15, portions in common with those shown in FIG. 14 described above are denoted by the same reference numerals, and the detailed description of those portions is omitted. In this case, an LD drive unit 100' includes eight LDDs 101E, 101F, 101G, 101H, 101I, 101J, 101K, and 101L and LDs 102E, 102F, 102G, 102H, 102I, 102J, 102K, and 102L that correspond to the LDDs 101E to 101L, respectively.

In the example shown in FIG. 15, optical beams emitted from the LDs 102K and 102L each pass through the optical-beam irradiation area 150 of the liquid crystal deflecting element $70_1$ and the optical-beam irradiation area 153 of the liquid crystal deflecting element $70_2$, and enter the cylindrical lens 140. Optical beams emitted from the LDs 102I and 102J each pass through the optical-beam irradiation area 150 of the liquid crystal deflecting element $70_1$ and the unirradiated area 151 of the liquid crystal deflecting element $70_2$, and enter the cylindrical lens 140. Optical beams emitted from the LDs 102G and 102H each pass through the optical-beam irradiation area 152 of the liquid crystal deflecting element $70_2$, and enter the cylindrical lens 140. Optical beams emitted from the LDs 102E and 102F directly enter the cylindrical lens 140. The optical beams that have entered the cylindrical lens 140 exit from the cylindrical lens 140 toward a reflection mirror (not shown).

Image-Data Control in Deflection:

For example, in the case of four beams shown in FIG. 14 as explained in the above first and second embodiments, when optical beams emitted from the LDs 102A to 102D are divided into two groups each of which is composed of a plurality of adjacent optical beams in the sub-scanning direction, and the optical beams in one of the groups are deflected by the action of the liquid crystal deflecting element so that the optical beams in the one group and the optical beams in the other group are alternately arranged on a surface to be scanned at regular intervals, the order of the optical beams in the sub-scanning direction after the deflection changes from that of before the deflection. Namely, the order of image data is shuffled on a line basis. Consequently, in order to keep the order of the image data unchanged before and after the deflection, it is necessary to change combinations of the image data and the channels of the optical beams at the time of deflection.

FIG. 16 illustrates an example of combinations of image data and channels of optical beams in a case of four beams for keeping the order of the image data unchanged before and after the deflection. Incidentally, line-by-line image data read out from the FIFO units 124A to 124D in FIG. 13 are modulated, and emitted as optical beams for the channels ch1 to ch4 from the LDs 102A to 102D. Therefore, by changing the combinations of the line-by-line image data and the FIFO units 124A to 124D, the combinations of the image data and the channels of the optical beams can be changed. Incidentally, in FIG. 16, the FIFO units 124A to 124D are denoted by FIFO#1 to FIFO#4 respectively.

A scan density in a default state, in which the liquid crystal deflecting elements $70_1$ and $70_2$ do not deflect the optical beams, is 600 dpi. In this case, the image data are arranged in the order of WDATA#1, WDATA#2, WDATA#3, and WDATA#4 in agreement with the order of FIFO#1 to FIFO#4. Therefore, the timing control unit 123 supplies the image data WDATA#1 to WDATA#4 that are read out from the line memory, the write enable signals WE#1 to WE#4, and the read enable signals RE#1 to RE#4 to the FIFO units FIFO#1 to FIFO#4 respectively.

Furthermore, when the first and second-stage deflections are performed by driving both the liquid crystal deflecting elements $70_1$ and $70_2$ as explained above with reference to FIG. 7C, the order of the image data WDATA#1 to WDATA#4 remains unchanged before and after the deflections. Therefore, the timing control unit 123 supplies the image data WDATA#1 to WDATA#4 that are read out from the line memory, the write enable signals WE#1 to WE#4, and the read enable signals RE#1 to RE#4 to the FIFO units FIFO#1 to FIFO#4 respectively in the same manner as in the case of the scan density of 600 dpi described above.

On the other hand, when the scan density is switched to 1200 dpi by driving only the first liquid crystal deflecting element $70_1$, as explained above with reference to FIG. 3B, the order of the channels ch1, ch2, ch3, and ch4 before the deflection is changed to the order of the channels ch1, ch3, ch2, and ch4 after the deflection, that is, the channel ch2 and the channel ch3 are interchanged before and after the deflection.

Therefore, the timing control unit 123 supplies the image data WDATA#3 read out from the line memory, the write enable signal WE#3, and the read enable signal RE#3 to the FIFO unit FIFO#2, and supplies the image data WDATA#2 read out from the line memory, the write enable signal WE#2, and the read enable signal RE#2 to the FIFO unit FIFO#3. The image data WDATA#1 and WDATA#4, the write enable signals WE#1 and WE#4, and the read enable signals RE#1 and RE#4 remain unchanged before and after the deflection.

FIG. 17 illustrates an example of combinations of image data and channels of optical beams in a case of eight beams for keeping the order of the image data unchanged before and after the deflection. In FIG. 17, the FIFO units for supplying the image data to, for example, the LDs 102E to 102L shown in FIG. 15 are denoted by FIFO#1, FIFO#2, FIFO#3, FIFO#4, FIFO#5, FIFO#6, FIFO#7, and FIFO#8 respectively.

A scan density in a default state, in which the liquid crystal deflecting elements $70_1$ and $70_2$ do not deflect the optical beams, is 600 dpi. In this case, the image data is arranged in the order of WDATA#1 to WDATA#8 in agreement with the order of FIFO#1 to FIFO#8. Therefore, the timing control unit 123 supplies the image data WDATA#1 to WDATA#8 read out from the line memory, the write enable signals WE#1 to WE#8, and the read enable signals RE#1 to RE#8 to the FIFO units FIFO#1 to FIFO#8 respectively.

When the scan density is switched to 1200 dpi by driving only the liquid crystal deflecting element $70_1$, as explained above with reference to FIG. 4B, the order of the channels ch1, ch2, ch3, ch4, ch5, ch6, ch7, and ch8 before the deflection is changed to the order of the channels ch1, ch5, ch2, ch6, ch3, ch7, ch4, and ch8 after the deflection.

Therefore, the timing control unit 123 supplies the image data WDATA#3 read out from the line memory, the write enable signal WE#3, and the read enable signal RE#3 to the FIFO unit FIFO#2. Likewise, the timing control unit 123 supplies the image data WDATA#5, the write enable signal WE#5, and the read enable signal RE#5 to the FIFO unit FIFO#3. The timing control unit 123 supplies the image data WDATA#7, the write enable signal WE#7, and the read enable signal RE#7 to the FIFO unit FIFO#4. The timing control unit 123 supplies the image data WDATA#2, the write enable signal WE#2, and the read enable signal RE#2 to the FIFO unit FIFO#5. The timing control unit 123 supplies the image data WDATA#4, the write enable signal WE#4, and the read enable signal RE#4 to the FIFO unit FIFO#6. The timing control unit 123 supplies the image data WDATA#6, the write enable signal WE#6, and the read enable signal RE#6 to the FIFO unit FIFO#7. The image data WDATA#1 and WDATA#8, the write enable signals WE#1 and WE#8, and the read enable signals RE#1 and RE#8 remain unchanged before and after the deflection.

When the first and second-stage deflections are performed by driving both the liquid crystal deflecting elements $70_1$ and $70_2$, as shown in FIG. 8C, the order of the channels ch1, ch2, ch3, ch4, ch5, ch6, ch7, and ch8 before the deflections is changed to the order of the channels ch1, ch3, ch5, ch7, ch2, ch4, ch6, and ch8 after the deflections.

Therefore, the timing control unit 123 supplies the image data WDATA#5 read out from the line memory, the write enable signal WE#5, and the read enable signal RE#5 to the FIFO unit FIFO#2. Likewise, the timing control unit 123 supplies the image data WDATA#2, the write enable signal WE#2, and the read enable signal RE#2 to the FIFO unit FIFO#3. The timing control unit 123 supplies the image data WDATA#6, the write enable signal WE#6, and the read enable signal RE#6 to the FIFO unit FIFO#4. The timing control unit 123 supplies the image data WDATA#3, the write enable signal WE#3, and the read enable signal RE#3 to the FIFO unit FIFO#5. The timing control unit 123 supplies the image data WDATA#7, the write enable signal WE#7, and the read enable signal RE#7 to the FIFO unit FIFO#6. The timing control unit 123 supplies the image data WDATA#4, the write enable signal WE#4, and the read enable signal RE#4 to the FIFO unit FIFO#7. The image data WDATA#1 and WDATA#8, the write enable signals WE#1 and WE#8, and the read enable signals RE#1 and RE#8 remain unchanged before and after the deflections.

For example, provided are in advance combinations between the image data and the channels of the optical beams depending on the scan density in the form of a table as shown in FIGS. 16 and 17 described above. The table can be stored in the ROM 112A in which the program run by the CPU 112 is stored in advance, or the timing control unit 123 can be provided with a ROM (not shown), and the table can be stored in the ROM in advance. When the scan density is specified, the CPU 112 or the timing control unit 123 reads and references the table stored in the ROM or the like so as to determine which FIFO unit to be supplied with line-by-line image data WDATA stored in the line memory in the timing control unit 123, a write enable signal WE, and a read enable signal RE.

Adjustment of Amount of Exposure:

As can be seen in FIGS. 14 and 15 described above, when optical beams are deflected with the liquid crystal deflecting element(s), the number of the liquid crystal deflecting elements, through which each of the optical beams composing multi-beam passes, is different from one optical beam to another. By passing through the liquid crystal deflecting element, an amount of the optical beam decreases. Furthermore, the transmittance of the liquid crystal deflecting element varies between when the liquid crystal is activated (i.e., at the time of deflection) and when the liquid crystal is deactivated.

FIGS. 18 and 19 illustrate examples of the transmittance with respect to each of optical beams for the channels ch1 to ch4 in each resolution mode (scan densities of 600 dpi, 1200 dpi, and 2400 dpi). FIG. 18 illustrates the example in the case of the 4-beam configuration shown in FIG. 14 described above, and FIG. 19 show the example in the case of the 8-beam configuration shown in FIG. 15 described above.

Incidentally, in FIGS. 18 and 19, a transmittance T denotes the transmittance when optical beam passes through none of the liquid crystal deflecting elements. Namely, the transmittance T denotes the transmittance of the entire optical system when optical beams emitted from any of the LD 102A to 102D irradiate the surface to be scanned without passing through both the liquid crystal deflecting elements $70_1$ and $70_2$. Furthermore, a transmittance $T_{on}$ denotes the transmittance when each of the liquid crystal deflecting elements $70_1$ and $70_2$ is activated (at the time of deflection), and a transmittance $T_{off}$ denotes the transmittance when each of the liquid crystal deflecting elements $70_1$ and $70_2$ is deactivated.

The case of the 4-beam configuration shown in FIG. 18 is explained. In the example shown in FIG. 14 described above, an optical beam emitted from the LD 102A enters the cylindrical lens 140 without passing through the liquid crystal deflecting elements $70_1$ and $70_2$. Therefore, the transmittance with respect to the optical beam emitted from the LD 102A (the channel ch1) is always the transmittance T regardless of the resolution mode.

On the other hand, optical beams emitted from the LDs 102B and 102C pass through only the liquid crystal deflecting element $70_1$, and enter the cylindrical lens 140. Furthermore, an optical beam emitted from the LD 102D passes through both the liquid crystal deflecting elements $70_1$ and $70_2$, and enters the cylindrical lens 140.

When it is in the resolution mode of 600 dpi, any of the liquid crystal deflecting elements $70_1$ and $70_2$ are not activated (OFF). Therefore, the transmittance with respect to the optical beams emitted from the LD 102B (the channel ch2) and the LD 102C (the channel ch3) is a transmittance $T \times T_{off}$. Furthermore, the transmittance with respect to the optical beam emitted from the LD 102D (the channel ch4) is a transmittance $T \times T_{off} \times T_{off}$.

When it is in the resolution mode of 1200 dpi, only the liquid crystal deflecting element $70_1$ is activated (ON), and the liquid crystal deflecting element $70_2$ is not activated (OFF). Therefore, the transmittance with respect to the optical beam of the channel ch2 is a transmittance $T \times T_{off}$, and the transmittance with respect to the optical beam of the channel ch3 is a transmittance $T \times T_{on}$. Furthermore, the transmittance with respect to the optical beam of the channel ch4 is a transmittance $T \times T_{on} \times T_{off}$.

Furthermore, when it is in the resolution mode of 2400 dpi, the liquid crystal deflecting elements $70_1$ and $70_2$ are both activated (ON). Therefore, the transmittance with respect to the optical beam of the channel ch2 is a transmittance $T \times T_{on}$, and the transmittance with respect to the optical beam of the channel ch3 is a transmittance $T \times T_{on}$. Furthermore, the transmittance with respect to the optical beam of the channel ch4 is a transmittance $T \times T_{on} \times T_{on}$.

In this manner, it can be seen that the transmittances with respect to the optical beams of the channels ch1 to ch4 differ depending on the resolution mode.

The case of the 8-beam configuration shown FIG. 19 is explained. In the example shown in FIG. 15 described above, optical beams emitted from the LDs 102E and 102F enter the cylindrical lens 140 without passing through the liquid crystal deflecting elements $70_1$ and $70_2$. Therefore, the transmittance with respect to the optical beams emitted from the LD 102E (the channel ch1) and the LD 102F (the channel ch2) is always the transmittance T regardless of the resolution mode.

Optical beams emitted from the LDs 102G and 102H pass through only the liquid crystal deflecting element $70_2$, and enter the cylindrical lens 140. Optical beams emitted from the LDs 102I and 102J pass through only the liquid crystal deflecting element $70_1$, and enter the cylindrical lens 140. Furthermore, optical beams emitted from the LDs 102K and 102L pass through both the liquid crystal deflecting elements $70_1$ and $70_2$, and enter the cylindrical lens 140.

When it is in the resolution mode of 600 dpi, any of the liquid crystal deflecting elements $70_1$ and $70_2$ are not activated (OFF). Therefore, the transmittance with respect to the optical beams emitted from the LDs 102G to 102J (the channels ch3 to ch6) is a transmittance $T \times T_{off}$. Furthermore, the transmittance with respect to the optical beams emitted from the LD 102K (the channel ch7) and the LD 102L (the channel ch8) is a transmittance $T \times T_{off} \times T_{off}$.

When it is in the resolution mode of 1200 dpi, only the liquid crystal deflecting element $70_1$ is activated (ON), and the liquid crystal deflecting element $70_2$ is not activated (OFF). Therefore, the transmittance with respect to the optical beams of the channels ch3 and ch4 is a transmittance $T \times T_{off}$, and the transmittance with respect to the optical beams of the channels ch5 and ch6 is a transmittance $T \times T_{on}$. Furthermore, the transmittance with respect to the optical beams of the channels ch7 and ch8 is a transmittance $T \times T_{on} \times T_{off}$.

Furthermore, when it is in the resolution mode of 2400 dpi, the liquid crystal deflecting elements $70_1$ and $70_2$ are both activated (ON). Therefore, the transmittance with respect to the optical beams of the channels ch3 to ch6 is a transmittance $T \times T_{on}$. Furthermore, the transmittance with respect to the optical beams of the channels ch7 and ch8 is a transmittance $T \times T_{on} \times T_{on}$.

In this manner, it can be seen that the transmittances with respect to the optical beams of the channels ch1 to ch8 differ depending on the resolution mode. In the case of the 8-beam configuration, with each two channels as a set, the transmittance differs by each set. More specifically, the channels ch1 and ch2, the channels ch3 and ch4, the channels ch5 and ch6, and the channels ch7 and ch8 each make a set, and the transmittance differs by each set.

In this manner, when the pitch of optical beams is switched by deflecting the optical beams with the liquid crystal deflecting element(s), the transmittance with respect to each optical beam changes depending on the resolution mode, and a light amount of the optical beam on the surface to be scanned varies in accordance with the change in transmittance. Consequently, for example, in an example where two-stage deflection is performed with two liquid crystal deflecting elements, in each of cases: the case where the deflection is not performed, the case where only the first-stage deflection is performed, and the case where the first and second-stage deflections are performed, it is necessary to adjust an amount of exposure to each optical beam in each of the resolution modes.

The adjustment of an amount of exposure to each optical beam is performed with a series of toner color patches explained above with reference to FIG. 10. At the time of deflection, a series of toner color patches is formed for each channel or each set of channels with the transmittance different from one another, an optical beam of the corresponding channel irradiates the series of patches, and an amount of exposure is adjusted so that the respective concentrations of toner patterns in each series of patches are the same predetermined value.

Figure 20:
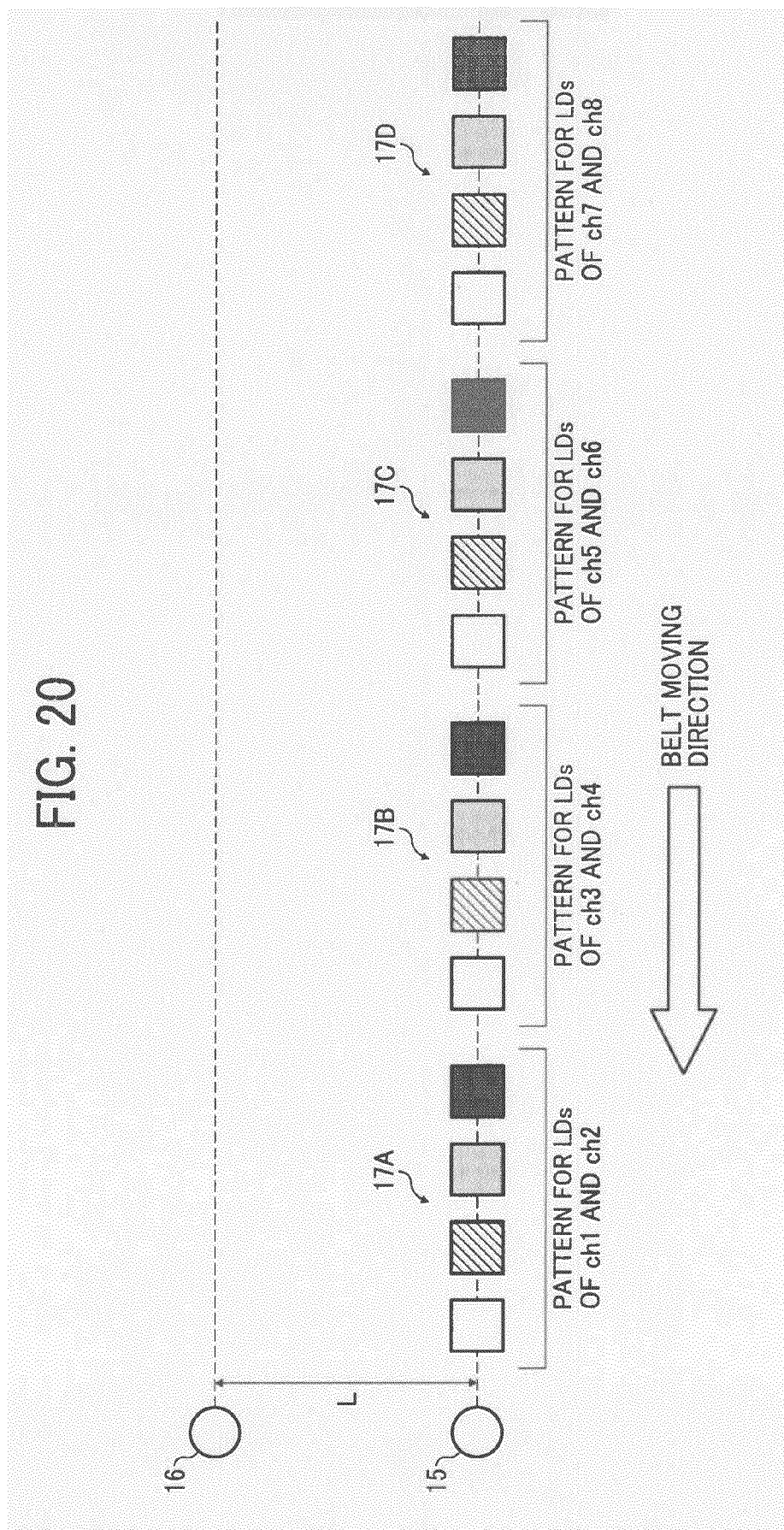
FIG. 20 is a schematic diagram illustrating an example of a series of patches for the 8-beam configuration.

FIG. 20 illustrates an example of a series of patches for the 8-beam configuration illustrated in FIG. 15. In FIG. 20, portions in common with those shown in FIG. 10 are denoted by the same reference numerals, and the detailed description of those portions is omitted. In this case, as described above, the transmittance differs by each set of two channels, so a series of patches 17A for the channels ch1 and ch2, a series of patches 17B for the channels ch3 and ch4, a series of patches 17C for the channels ch5 and ch6, and a series of patches 17D for the channels ch7 and ch8 are formed. Then, an amount of exposure is adjusted by adjusting a light amount of each of the LDs 102E to 102L or the like so that the respective concentrations of toner patterns in each series of patches 17A to 17D are the same predetermined value.

Figure 21:
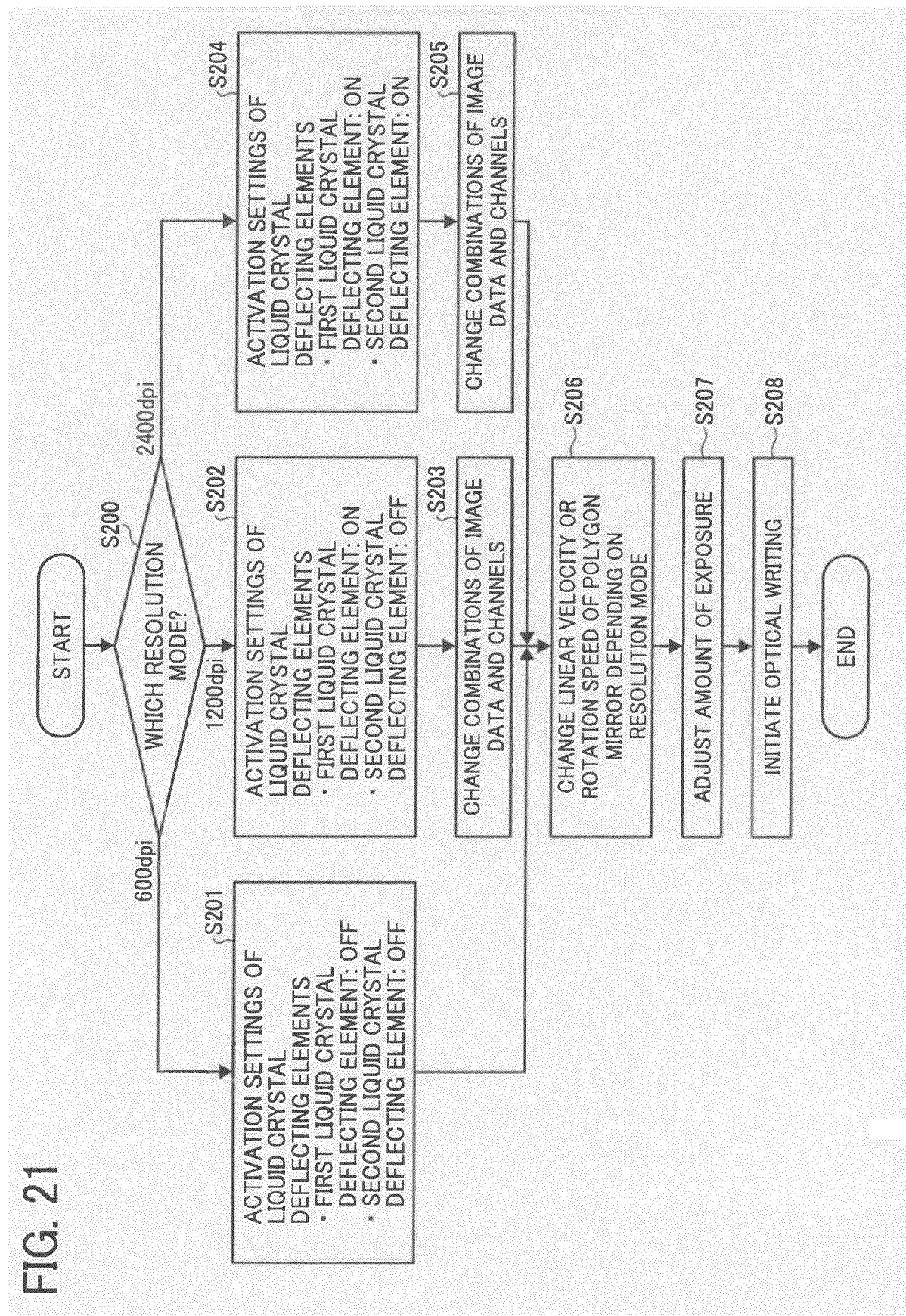
FIG. 21 is a flowchart illustrating an example of a beam-pitch switching process according to the third embodiment of the present invention.

FIG. 21 is a flowchart illustrating an example of a beam-pitch switching process according to the third embodiment. Each step in the flowchart is executed, for example, by the CPU 112 in accordance with the program. First, ahead of the process illustrated in this flowchart, the resolution mode is specified. Here, can be selected any one from among the resolution mode of 600 dpi in which the liquid crystal deflecting elements $70_1$ and $70_2$ are not activated, the resolution mode of 1200 dpi in which only the liquid crystal deflecting element $70_1$ is activated, and the resolution mode of 2400 dpi in which the liquid crystal deflecting elements $70_1$ and $70_2$ are activated.

At the first Step S200, the CPU 112 determines the currently-specified resolution mode. When determining that the resolution mode of 600 dpi has been specified, the CPU 112 moves the process onto Step S201. At Step S201, the CPU 112 supplies liquid-crystal ON/OFF control signals #1 and #2 for setting the liquid crystal deflecting elements $70_1$ and $70_2$ to be deactivated (OFF) to the liquid-crystal drive unit 130. Then, the CPU 112 moves the process onto Step S206 to be described later.

Furthermore, at Step S200, when determining that the resolution mode of 1200 dpi has been specified, the CPU 112 moves the process onto Step S202. At Step S202, the CPU 112 supplies a liquid-crystal ON/OFF control signal #1 for causing the liquid crystal deflecting element $70_1$ to be activated (ON) and a liquid-crystal ON/OFF control signal #2 for causing the liquid crystal deflecting element $70_2$ to be deactivated (OFF) to the liquid-crystal drive unit 130.

At the next Step S203, the CPU 112 changes the combinations of image data WDATA and channels as explained above with reference to FIGS. 16 and 17. For example, the CPU 112 specifies the read order of the image data WDATA stored in the line memory with respect to the timing control unit 123 in the image-data control unit 110 with reference to the table of a correspondence relationship between the image data WDATA and the channels in each of the resolution modes that is stored in the ROM 112A. Then, the CPU 112 moves the process onto Step S206.

Furthermore, at Step S200, when determining that the resolution mode of 2400 dpi has been specified, the CPU 112 moves the process onto Step S204. At Step S204, the CPU 112 supplies a liquid-crystal ON/OFF control signal #1 for causing the liquid crystal deflecting element $70_1$ to be activated (ON) and a liquid-crystal ON/OFF control signal #2 for causing the liquid crystal deflecting element $70_2$ to be activated (ON) to the liquid-crystal drive unit 130. Then, at Step S205, the CPU 112 changes the combinations of image data WDATA and channels as explained above with reference to FIGS. 16 and 17, and moves the process onto Step S206.

At Step S206, to make the intervals of main scanning lines in the sub-scanning direction uniform, the CPU 112 changes the linear velocity of main scanning or the rotation speed of the polygon mirror 37 in accordance with the resolution mode. Namely, in the resolution mode of 600 dpi, the linear velocity or the rotation speed of the polygon mirror 37 is not changed. In the resolution mode of 1200 dpi, the rotation speed of the polygon mirror 37 is doubled, or the linear velocity with respect to the photosensitive drum is reduced to one-half. Furthermore, in the resolution mode of 2400 dpi, the rotation speed of the polygon mirror 37 is quadrupled, or the linear velocity with respect to the photosensitive drum is reduced to one-quarter.

At the next Step S207, the CPU 112 adjusts an amount of exposure to the optical beam of each channel. Namely, the CPU 112 forms a series of toner color patches for each channel or each set of channels with the transmittance different from one another as explained above with reference to FIG. 20 at the time of deflection, and adjusts an amount of exposure of each of the channels so that the respective concentrations of toner patterns in each series of patches are the same predetermined value. However, it is not limited to this; alternatively, parameters in the adjustment of an amount of exposure in each resolution mode with a series of patches as shown in FIG. 20 can be stored in a nonvolatile memory (not shown) or the like in advance, and the adjustment of an amount of exposure can be made with the stored parameters.

After the adjustment of an amount of exposure is made at Step S207, the process is moved onto Step S208, and the CPU 112 controls the units of the image forming apparatus 20 to initiate the optical writing.

Incidentally, in the flowchart shown in FIG. 21, there is shown the example where the liquid crystal deflecting elements $70_1$ and $70_2$ are included and the two-stage deflection is performed. If one liquid crystal deflecting element 70 is included and one-stage deflection is performed, the processes at Steps S204 and S205 can be omitted.

Correction of Color Shift:

In a so-called tandem-type color image forming apparatus such as the image forming apparatus 20, different color images are written with optical beams output from different LD units for each color image, and when the formed images are transferred onto a transfer sheet, a so-called color shift may occur because the pixel locations among the respective color images are shifted, for example, in the sub-scanning direction which is the sheet conveying direction. To resolve such a color shift, it has been conventionally known that before printing the images actually to process, a correction process is performed in such a manner that a specific correction pattern image is formed for example on the conveyance belt 2, and the occurrence of a color shift among respective color images is prevented with the correction pattern image.

In this color-shift correction process, respective toner color patterns are formed on the conveyance belt 2; an amount of color shift among the respective color images is calculated by detecting the toner patterns with a specular light; and the color-shift correction control is executed on the basis of a result of the calculation.

Figure 22A:
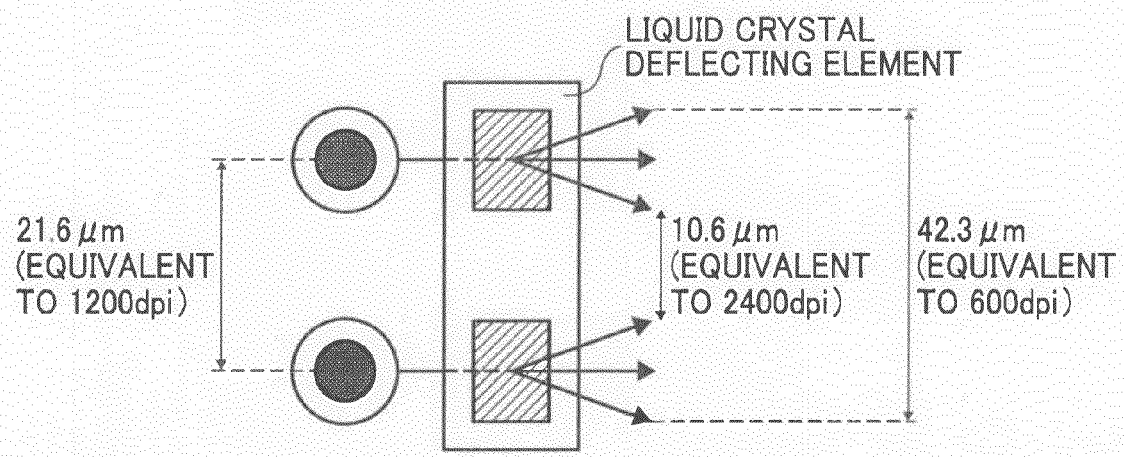
FIGS. 22A and 22B are schematic diagrams conceptually illustrating how optical beams, emitted from a multi-beam emitting source, are deflected by a liquid crystal deflecting element according to a conventional technology.
Figure 22B:
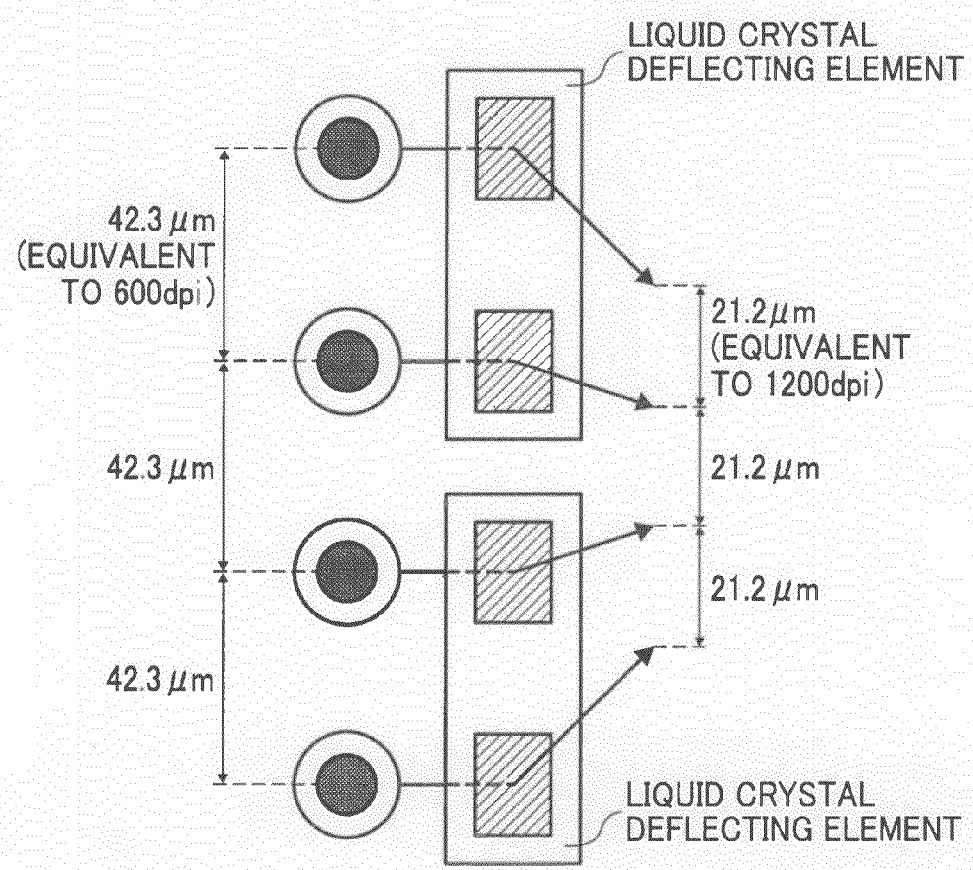

When the scan density, i.e., the pixel density in the sub-scanning direction is switched by switching the beam pitch with a liquid crystal deflecting element, in the conventional beam-pitch adjusting method with the liquid crystal deflecting element (see FIGS. 22A and 22B), the positions of all optical beams are changed to switch the pitch; therefore, the effect of preventing the color shift is low.

On the other hand, in the third embodiment, the pitch is switched by causing a single liquid crystal deflecting element to act on optical beams in one of two groups into which an array of optical beams emitted from the multi-beam emitting source is divided, and therefore, the number of optical beams to be deflected is just half the total optical beams. Furthermore, since one liquid crystal deflecting element is caused to act on the optical beams to be deflected, an amount of deflection of each of the optical beams is the same. Therefore, a color shift caused by the switching of the beam pitch can be effectively prevented.

According to the present invention, the switching of the beam pitch with the liquid crystal deflecting element can be achieved with a simpler drive method and a simpler configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   an optical-path deflecting unit that deflects optical paths of optical beams in one group out of two groups, the optical beams being provided in a sub-scanning direction at a predetermined pitch, and each of the two groups being composed of more or less a same number of adjacent optical beams that are adjacent in the sub-scanning direction;
   a scanning unit that scans a surface to be scanned in a main scanning direction with the one group of the optical beams of which optical paths have been deflected by the optical-path deflecting unit and another group of the optical beams of which optical paths are not deflected by the optical-path deflecting unit; and
   a control unit that controls the optical-path deflecting unit to deflect optical paths of the optical beams in the one group so that irradiation positions of the optical beams in the one group on the surface to be scanned and irradiation positions of the optical beams in the another group on the surface to be scanned are alternately arranged in the sub-scanning direction at regular intervals, so that a plurality of pairs of the plurality of light beams are formed, each pair being composed of an optical beam in the one group and an optical beam in the another group that are positioned in the sub-scanning direction, and so that the plurality of pairs, in which the optical beams composing each pair are positioned in the sub-scanning direction in each pair, are alternately arranged in the main-scanning direction at regular intervals.

2. The image forming apparatus according to claim 1, wherein
   the optical-path deflecting unit deflects the optical paths of the optical beams in the one group by causing a single optical-path deflecting element.

3. The image forming apparatus according to claim 1, wherein
   the control unit controls the optical-path deflecting unit so that one pair of the beams of the plurality of the pairs is deflected toward another pair of the beams of the plurality of the pairs in the sub-scanning direction.

4. The image forming apparatus according to claim 3, wherein
   the control unit controls the optical-path deflecting unit so that in addition to the one pair of the beams of the plurality of the pairs, one more pair of the beams of the plurality of the pairs is deflected toward the another pair of the beams of the plurality of the pairs in the sub-scanning direction.

5. The image forming apparatus according to claim 1, wherein
   the plurality of optical beams are emitted on the basis of corresponding image data, and
   the control unit changes a correspondence relation between the image data and the plurality of optical beams in accordance with the order of a plurality of optical beams composed of the optical beams in the one group of which the optical paths have been deflected by the optical-path deflecting unit and the optical beams in the another group of which the optical paths are not deflected by the optical-path deflecting unit in the sub-scanning direction.

6. The image forming apparatus according to claim 1, further comprising
   a light-amount adjusting unit that adjusts an amount of light on the surface to be scanned irradiated with the optical beams in the one group of which the optical paths have been deflected by the optical-path deflecting unit and the optical beams in the another group, wherein
   the light-amount adjusting unit detects a pattern formed by scanning of the surface to be scanned with the optical beams in the one group of which the optical paths have been deflected and a pattern formed by scanning of the surface to be scanned with the optical beams in the another group, and adjusts the amount of light on the basis of a result of the detection.

7. The image forming apparatus according to claim 1, wherein
   a pitch of the optical beams in the another group is a pitch of a light source of the optical beams, and a pitch between the optical beam in the another group and the optical beam in the one group is a pitch corresponding to a specified scan density.

8. An image forming apparatus comprising:
   an optical-path deflecting means for deflecting optical paths of optical beams in one group out of two groups, the optical beams being provided in a sub-scanning direction at a predetermined pitch, and each of the two groups being composed of more or less a same number of adjacent optical beams that are adjacent in the sub-scanning direction;
   a scanning means for scanning a surface to be scanned in a main scanning direction with the one group of the optical beams of which the optical paths have been deflected by the optical-path deflecting means and another group of the optical beams of which the optical paths are not deflected by the optical-path deflecting means; and
   a control means for controlling the optical-path deflecting means to deflect optical paths of the optical beams in the one group so that irradiation positions of the optical beams in the one group on the surface to be scanned and irradiation positions of the optical beams in the another group on the surface to be scanned are alternately arranged in the sub-scanning direction at regular intervals, so that a plurality of pairs of the plurality of light beams are formed, each pair being composed of an optical beam in the one group and an optical beam in the another group that are positioned in the sub-scanning direction, and so that the plurality of pairs, in which the optical beams composing each pair are positioned in the sub-scanning direction in each pair, are alternately arranged in the main-scanning direction at regular intervals.

9. The image forming apparatus according to claim 8, wherein
   the optical-path deflecting means deflects the optical paths of the optical beams in the one group by causing a single optical-path deflecting element.

10. The image forming apparatus according to claim 8, wherein the control means controls the optical-path deflecting unit so that one pair of the beams of the plurality of the pairs is deflected toward another pair of the beams of the plurality of the pairs in the sub-scanning direction.

11. The image forming apparatus according to claim 10, wherein
the control means controls the optical-path deflecting unit so that in addition to the one pair of the beams of the plurality of the pairs, one more pair of the beams of the plurality of the pairs is deflected toward the another pair of the beams of the plurality of the pairs in the sub-scanning direction.

12. The image forming apparatus according to claim 8, wherein
the plurality of optical beams are emitted on the basis of corresponding image data, and
the control means changes a correspondence relation between the image data and the plurality of optical beams in accordance with the order of a plurality of optical beams composed of the optical beams in the one group of which the optical paths have been deflected by the optical-path deflecting means and the optical beams in the another group of which the optical paths are not deflected by the optical-path deflecting means in the sub-scanning direction.

13. The image forming apparatus according to claim 8, further comprising
a light-amount adjusting means for adjusting an amount of light on the surface to be scanned irradiated with the optical beams in the one group of which the optical paths have been deflected by the optical-path deflecting means and the optical beams in the another group, wherein
the light-amount adjusting means detects a pattern formed by scanning of the surface to be scanned with the optical beams in the one group of which the optical paths have been deflected and a pattern formed by scanning of the surface to be scanned with the optical beams in the another group, and adjusts the amount of light on the basis of a result of the detection.

14. The image forming apparatus according to claim 8, wherein
a pitch of the optical beams in the another group is a pitch of a light source of the optical beams, and
a pitch between the optical beam in the another group and the optical beam in the one group is a pitch corresponding to a specified scan density.

15. A method for controlling image forming used in an image forming apparatus comprising:
deflecting optical paths of optical beams in one group out of two groups by an optical-path deflecting unit, the optical beams being provided in a sub-scanning direction at a predetermined pitch, and each of the two groups being composed of more or less a same number of adjacent optical beams that are adjacent to the sub-scanning direction;
scanning a surface to be scanned in a main scanning direction with the one group of the optical beams of which optical paths have been deflected by the optical-path deflecting unit and another group of the optical beams of which optical paths are not deflected by the optical-path deflecting unit by a scanning unit; and
controlling by a control unit the optical-path deflecting unit to deflect optical paths of the optical beams in the one group so that irradiation positions of the optical beams in the one group on the surface to be scanned and irradiation positions of the optical beams in the another group on the surface to be scanned are alternately arranged in the sub-scanning direction at regular intervals, so that a plurality of pairs of the plurality of light beams are formed, each pair being composed of an optical beam in the one group and an optical beam in the another group that are positioned in the sub-scanning direction, and so that the plurality of pairs, in which the optical beams composing each pair are positioned in the sub-scanning direction in each pair, are alternately arranged in the main-scanning direction at regular intervals.

* * * * *